(12) United States Patent
Duan et al.

(10) Patent No.: US 12,526,104 B2
(45) Date of Patent: Jan. 13, 2026

(54) UPLINK AND DOWNLINK RIS-AIDED SIGNALING

(71) Applicant: QUALCOMM INCORPORATED, San Diego, CA (US)

(72) Inventors: Weimin Duan, San Diego, CA (US); Alexandros Manolakos, Escondido, CA (US); Hung Dinh Ly, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 284 days.

(21) Appl. No.: 18/264,528

(22) PCT Filed: Jan. 31, 2022

(86) PCT No.: PCT/US2022/014587
§ 371 (c)(1),
(2) Date: Aug. 7, 2023

(87) PCT Pub. No.: WO2022/197378
PCT Pub. Date: Sep. 22, 2022

(65) Prior Publication Data
US 2024/0048307 A1    Feb. 8, 2024

(30) Foreign Application Priority Data

Mar. 16, 2021    (GR) .............................. 20210100160

(51) Int. Cl.
*H04W 72/04*    (2023.01)
*H04B 7/04*    (2017.01)
(Continued)

(52) U.S. Cl.
CPC ....... *H04L 5/0048* (2013.01); *H04B 7/04013* (2023.05); *H04W 24/10* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2021/0302561 A1* | 9/2021 | Bayesteh | G01S 13/42 |
| 2022/0014935 A1* | 1/2022 | Haija | H04L 5/0048 |
| 2023/0258759 A1* | 8/2023 | Wang | G01S 1/0423 |
| | | | 455/456.1 |

FOREIGN PATENT DOCUMENTS

| | | |
|---|---|---|
| CN | 111245494 A | 6/2020 |
| CN | 111912409 A | 11/2020 |

(Continued)

OTHER PUBLICATIONS

International Search Report and Written Opinion—PCT/US2022/014587—ISA/EPO—May 12, 2022.

(Continued)

*Primary Examiner* — Maharishi V Khirodhar
(74) *Attorney, Agent, or Firm* — Sunstein LLP / Qualcomm Incorporated

(57) ABSTRACT

A signal reporting method includes: transmitting, from a first wireless signaling device at a first time, a first PRS (positioning reference signal) to a second wireless signaling device via a first RIS (reconfigurable intelligent surface); receiving, at the first wireless signaling device at a second time, a second PRS from the second wireless signaling device via a second RIS that is physically separate from the first RIS; and providing a signal report including at least one time value corresponding to the first time and the second time, and indicative of the first PRS and the second PRS.

25 Claims, 12 Drawing Sheets

(51) Int. Cl.
*H04L 5/00* (2006.01)
*H04W 24/10* (2009.01)
*H04W 64/00* (2009.01)
*H04W 76/00* (2018.01)
*H04W 88/08* (2009.01)

(56) References Cited

FOREIGN PATENT DOCUMENTS

| | | |
|---|---|---|
| CN | 111983560 A | 11/2020 |
| CN | 112346009 A | 2/2021 |
| JP | H0427887 A | 1/1992 |

OTHER PUBLICATIONS

Wymeersch H., et al., "Radio Localization and Mapping with Reconfigurable Intelligent Surfaces", arxiv.org, 201 Olin Library Cornell University, Ithaca, NY, 14853, Dec. 19, 2019, XP081569725, pp. 1-7, Figure 1, Abstract, Right-Hand col. Lines 29-31, Figure 3, pp. 5,6, p. 2, left-hand column, line 2-8 p. 3, left-hand column, line 2-4 p. 4, right-hand column, lines 6, 7, 11, 12, 36, 37 p. 5, left-hand column, line 15-17, pp. 5,6, Figure 3, pp. 4-5, Section RIS Control.
Taiwan Search Report—TW111104281—TIPO—May 14, 2025.

\* cited by examiner

UPLINK AND DOWNLINK RIS-AIDED SIGNALING

CROSS-REFERENCE TO RELATED APPLICATIONS

This application is the National Stage of International Application No. PCT/US2022/014587, filed Jan. 31, 2022, entitled "UPLINK AND DOWNLINK RIS-AIDED SIGNALING," which claims the benefit of Greek Patent Application No. 20210100160, filed Mar. 16, 2021, entitled "UPLINK AND DOWNLINK RIS-AIDED SIGNALING," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example first wireless signaling device includes: a transceiver configured to transmit and receive wireless signals; a memory; and a processor communicatively coupled to the transceiver and the memory and configured to: transmit, via the transceiver at a first time, a first PRS (positioning reference signal) to a second wireless signaling device via a first RIS (reconfigurable intelligent surface); receive, via the transceiver at a second time, a second PRS from the second wireless signaling device via a second RIS that is physically separate from the first RIS; and provide a signal report including at least one time value corresponding to the first time and the second time, and indicative of the first PRS and the second PRS.

Implementations of such a device may include one or more of the following features. The processor is configured to transmit, via the transceiver to a server, a request for the second wireless signaling device to transmit the second PRS to the second RIS in order to transmit the second PRS to the first wireless signaling device. The processor is configured to: receive a first reference signal from the second wireless signaling device via the transceiver via the second RIS; receive a second reference signal from the second wireless signaling device via the transceiver via a third RIS that is separate from the second RIS; and transmit the request for the second wireless signaling device to transmit the second PRS to the second RIS based on a first quality metric of the first reference signal at the first wireless signaling device being better than a second quality metric of the second reference signal at the first wireless signaling device.

Also or alternatively, implementations of such a device may include one or more of the following features. The processor is configured to transmit the first PRS in response to receiving the second PRS. The at least one time value includes a time difference between the first time and the second time.

An example signal reporting method includes: transmitting, from a first wireless signaling device at a first time, a first PRS (positioning reference signal) to a second wireless signaling device via a first RIS (reconfigurable intelligent surface); receiving, at the first wireless signaling device at a second time, a second PRS from the second wireless signaling device via a second RIS that is physically separate from the first RIS; and providing a signal report including at least one time value corresponding to the first time and the second time, and indicative of the first PRS and the second PRS.

Implementations of such a method may include one or more of the following features. The method includes transmitting, to a server, a request for the second wireless signaling device to transmit the second PRS to the second RIS in order to transmit the second PRS to the first wireless signaling device. The method includes: receiving, at the first wireless signaling device, a first reference signal from the second wireless signaling device via the second RIS; and receiving, at the first wireless signaling device, a second reference signal from the second wireless signaling device via a third RIS that is separate from the second RIS; where the request for the second wireless signaling device to transmit the second PRS to the second RIS is transmitted based on a first quality metric of the first reference signal at the first wireless signaling device being better than a second quality metric of the second reference signal at the first wireless signaling device.

Also or alternatively, implementations of such a method may include one or more of the following features. The first PRS is transmitted in response to receiving the second PRS. The at least one time value includes a time difference between the first time and the second time.

Another example first wireless signaling device includes: means for transmitting, at a first time, a first PRS (positioning reference signal) to a second wireless signaling device via a first RIS (reconfigurable intelligent surface); means for receiving, at a second time, a second PRS from the second wireless signaling device via a second RIS that is physically separate from the first RIS; and means for providing a signal report including at least one time value corresponding to the first time and the second time, and indicative of the first PRS and the second PRS.

Implementations of such a device may include one or more of the following features. The device includes means for transmitting, to a server, a request for the second wireless signaling device to transmit the second PRS to the second RIS in order to transmit the second PRS to the first wireless signaling device. The device includes: means for receiving a first reference signal from the second wireless signaling device via the second RIS; and means for receiving a second reference signal from the second wireless signaling device via a third RIS that is separate from the second RIS; where the means for transmitting the request includes means for transmitting the request based on a first quality metric of the first reference signal at the first wireless signaling device being better than a second quality metric of the second reference signal at the first wireless signaling device.

Also or alternatively, implementations of such a device may include one or more of the following features. The means for transmitting the first PRS include means for transmitting the first PRS in response to receiving the second PRS. The at least one time value includes a time difference between the first time and the second time.

An example non-transitory, processor-readable storage medium includes processor-readable instructions to cause a processor of a first wireless signaling device to: transmit, at a first time, a first PRS (positioning reference signal) to a second wireless signaling device via a first RIS (reconfigurable intelligent surface); receive, at a second time, a second PRS from the second wireless signaling device via a second RIS that is physically separate from the first RIS; and provide a signal report including at least one time value corresponding to the first time and the second time, and indicative of the first PRS and the second PRS.

Implementations of such a storage medium may include one or more of the following features. The storage medium includes processor-readable instructions to cause the processor to transmit, to a server, a request for the second wireless signaling device to transmit the second PRS to the second RIS in order to transmit the second PRS to the first wireless signaling device. The storage medium includes processor-readable instructions to cause the processor to: receive a first reference signal from the second wireless signaling device via the second RIS; and receive a second reference signal from the second wireless signaling device via a third RIS that is separate from the second RIS; where the processor-readable instructions to cause the processor to transmit the request include processor-readable instructions to cause the processor to transmit the request based on a first quality metric of the first reference signal at the first wireless signaling device being better than a second quality metric of the second reference signal at the first wireless signaling device.

Also or alternatively, implementations of such a storage medium may include one or more of the following features. The processor-readable instructions to cause the processor to transmit the first PRS include processor-readable instructions to cause the processor to transmit the first PRS in response to receiving the second PRS. The at least one time value includes a time difference between the first time and the second time.

An example computing device includes: a memory; and a processor communicatively coupled to the memory and configured to: obtain at least one first time value corresponding to (1) a first time of departure of a first PRS (positioning reference signal) from a first wireless signaling device sent to a second wireless signaling device via a first RIS (reconfigurable intelligent surface) and (2) a first time of arrival of a second PRS sent from the second wireless signaling device to the first wireless signaling device via a second RIS that is physically separate from the first RIS; obtain at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS; and determine, based on the at least one first time value and the at least one second time value, a first range between the first wireless signaling device and the first RIS, or a second range between the first wireless signaling device and the second RIS, or a combination thereof.

Implementations of such a computing device may include one or more of the following features. The processor is configured to determine a location of the first wireless signaling device based on: the first range and a first angle of departure of the first PRS from the first wireless signaling device; or the first range and a first angle of arrival of the first PRS at the first RIS; or the second range and a second angle of departure of the second PRS from the second RIS; or the second range and a second angle of arrival of the second PRS at the first wireless signaling device; or any combination thereof. The processor is configured to: obtain at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RTS that is physically separate from the third RIS; obtain at least one fourth time value corresponding to (1) a fourth time of departure of the fourth PRS from the third wireless signaling device sent to the first wireless signaling device via the fourth RIS and (2) a fourth time of arrival of the third PRS sent from the first wireless signaling device to the third wireless signaling device via the third RIS; determine, based on the at least one third time value and the at least one fourth time value, a third range between the first wireless signaling device and the third RIS, or a fourth range between the first wireless signaling device and the fourth RIS, or a combination thereof; and determine a location of the first wireless signaling device based on (1) the first range, or the second range, or a combination thereof and (2) the third range, or the fourth range, or a combination thereof; where a combination of the first RIS, the second RIS, the third RIS, and the fourth RIS includes at least three physically separate RISes. The third wireless signaling device is physically separate from the second wireless signaling device.

Also or alternatively, implementations of such a computing device may include one or more of the following features. The processor is configured to determine the first range, or the second range, or the combination thereof, based on a cumulative travel time of the first PRS from the first wireless signaling device to the first RIS and the second PRS from the second RIS to the first wireless signaling device. The computing device is a server, and the processor is configured to: schedule the first PRS based on a first request for the first PRS to be reflected by the first RIS; or schedule the second PRS based on a second request for the second. PRS to be reflected by the second RIS; or a combination thereof.

An example position information determining method includes: obtaining, at a computing device, at least one first time value corresponding to (1) a first time of departure of a first PRS (positioning reference signal) from a first wireless signaling device sent to a second wireless signaling device via a first RIS (reconfigurable intelligent surface) and (2) a first time of arrival of a second PRS sent from the second wireless signaling device to the first wireless signaling device via a second RIS that is physically separate from the first RIS; obtaining, at the computing device, at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS; and determining, at the computing device and based on the at least one first time value and the at least one second time value, a first range between the first wireless signaling device and the first RIS, or a second range between the first wireless signaling device and the second RIS, or a combination thereof.

Implementations of such a method may include one or more of the following features. The method includes determining a location of the first wireless signaling device based on: the first range and a first angle of departure of the first PRS from the first wireless signaling device; or the first range and a first angle of arrival of the first PRS at the first RIS; or the second range and a second angle of departure of the second PRS from the second RIS; or the second range and a second angle of arrival of the second PRS at the first wireless signaling device; or any combination thereof. The method includes: obtaining, at the computing device, at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RIS that is physically separate from the third RIS; obtaining, at the computing device, at least one fourth time value corresponding to (1) a fourth time of departure of the fourth PRS from the third wireless signaling device sent to the first wireless signaling device via the fourth RIS and (2) a fourth time of arrival of the third PRS sent from the first wireless signaling device to the third wireless signaling device via the third RIS; determining, at the computing device and based on the at least one third time value and the at least one fourth time value, a third range between the first wireless signaling device and the third RIS, or a fourth range between the first wireless signaling device and the fourth RIS, or a combination thereof; and determining, at the computing device, a location of the first wireless signaling device based on (1) the first range, or the second range, or a combination thereof and (2) the third range, or the fourth range, or a combination thereof; where a combination of the first RIS, the second RIS, the third RIS; and the fourth RIS includes at least three physically separate RISes. The third wireless signaling device is physically separate from the second wireless signaling device.

Also or alternatively, implementations of such a method may include one or more of the following features. The first range, or the second range, or the combination thereof, is determined based on a cumulative travel time of the first PRS from the first wireless signaling device to the first RIS and the second PRS from the second RIS to the first wireless signaling device. The computing device is a server, and the method includes: scheduling, by the server, the first PRS based on a first request for the first PRS to be reflected by the first RIS; or scheduling, by the server, the second PRS based on a second request for the second PRS to be reflected by the second RIS; or a combination thereof.

Another example computing device includes: means for obtaining at least one first time value corresponding to (1) a first time of departure of a first PRS (positioning reference signal) from a first wireless signaling device sent to a second wireless signaling device via a first RIS (reconfigurable intelligent surface) and (2) a first time of arrival of a second PRS sent from the second wireless signaling device to the first wireless signaling device via a second RIS that is physically separate from the first RIS; means for obtaining at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS; and means for determining, based on the at least one first time value and the at least one second time value, a first range between the first wireless signaling device and the first RIS, or a second range between the first wireless signaling device and the second RIS, or a combination thereof.

Implementations of such a computing device may include one or more of the following features. The computing device includes means for determining a location of the first wireless signaling device based on: the first range and a first angle of departure of the first PRS from the first wireless signaling device; or the first range and a first angle of arrival of the first PRS at the first RIS; or the second range and a second angle of departure of the second PRS from the second RIS; or the second range and a second angle of arrival of the second PRS at the first wireless signaling device; or any combination thereof. The computing device includes: means for obtaining at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RIS that is physically separate from the third RIS; means for obtaining at least one fourth time value corresponding to (1) a fourth time of departure of the fourth PRS from the third wireless signaling device sent to the first wireless signaling device via the fourth RIS and (2) a fourth time of arrival of the third PRS sent from the first wireless signaling device to the third wireless signaling device via the third RIS; means for determining, based on the at least one third time value and the at least one fourth time value, a third range between the first wireless signaling device and the third RIS, or a fourth range between the first wireless signaling device and the fourth RIS, or a combination thereof; and means for determining a location of the first wireless signaling device based on (1) the first range, or the second range, or a combination thereof and (2) the third range, or the fourth range, or a combination thereof; where a combination of the first RIS, the second RIS, the third RIS, and the fourth RIS includes at least three physically separate RISes. The third wireless signaling device is physically separate from the second wireless signaling device.

Also or alternatively, implementations of such a computing device may include one or more of the following features. Means for determining the first range, or the second range, or the combination thereof include means for determining the first range, or the second range, or the combination thereof based on a cumulative travel time of the first PRS from the first wireless signaling device to the first RIS and the second PRS from the second RIS to the first wireless signaling device. The computing device is a server, and the computing device includes: means for scheduling the first PRS based on a first request for the first PRS to be reflected by the first RIS; or means for scheduling the second PRS based on a second request for the second PRS to be reflected by the second RIS; or a combination thereof.

Another example non-transitory, processor-readable storage medium includes processor-readable instructions to cause a processor of a computing device to: obtain at least one first time value corresponding to (1) a first time of departure of a first PRS (positioning reference signal) from a first wireless signaling device sent to a second wireless signaling device via a first RIS (reconfigurable intelligent surface) and (2) a first time of arrival of a second PRS sent from the second wireless signaling device to the first wireless signaling device via a second RIS that is physically separate from the first RIS; obtain at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS; and determine, based on the at least one first time value and the at least one second time value, a first range between the first wireless signaling device and the first RIS, or a second range between the first wireless signaling device and the second RIS, or a combination thereof.

Implementations of such a storage medium may include one or more of the following features. The storage medium includes processor-readable instructions to cause the processor to determine a location of the first wireless signaling device based on: the first range and a first angle of departure of the first PRS from the first wireless signaling device; or the first range and a first angle of arrival of the first PRS at the first RIS; or the second range and a second angle of departure of the second. PRS from the second RIS; or the second range and a second angle of arrival of the second PRS at the first wireless signaling device; or any combination thereof. The storage medium includes processor-readable instructions to cause the processor to: obtain at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RIS that is physically separate from the third RIS; obtain at least one fourth time value corresponding to (1) a fourth time of departure of the fourth PRS from the third wireless signaling device sent to the first wireless signaling device via the fourth RTS and (2) a fourth time of arrival of the third PRS sent from the first wireless signaling device to the third wireless signaling device via the third RIS; determine, based on the at least one third time value and the at least one fourth time value, a third range between the first wireless signaling device and the third RIS, or a fourth range between the first wireless signaling device and the fourth RIS, or a combination thereof; and determine a location of the first wireless signaling device based on (1) the first range, or the second range, or a combination thereof and (2) the third range, or the fourth range, or a combination thereof; where a combination of the first RIS, the second RIS, the third RIS, and the fourth RIS includes at least three physically separate RISes. The third wireless signaling device is physically separate from the second wireless signaling device.

Also or alternatively, implementations of such a storage device may include one or more of the following features. The processor-readable instructions to cause the processor to determine the first range, or the second range, or the combination thereof include processor-readable instructions to cause the processor to determine the first range, or the second range, or the combination thereof based on a cumulative travel time of the first PRS from the first wireless signaling device to the first RIS and the second PRS from the second RIS to the first wireless signaling device. The storage medium includes processor-readable instructions to cause the processor to: schedule the first PRS based on a first request for the first PRS to be reflected by the first RIS; or schedule the second PRS based on a second request for the second PRS to be reflected by the second RIS; or a combination thereof.

DETAILED DESCRIPTION

Figure 1:
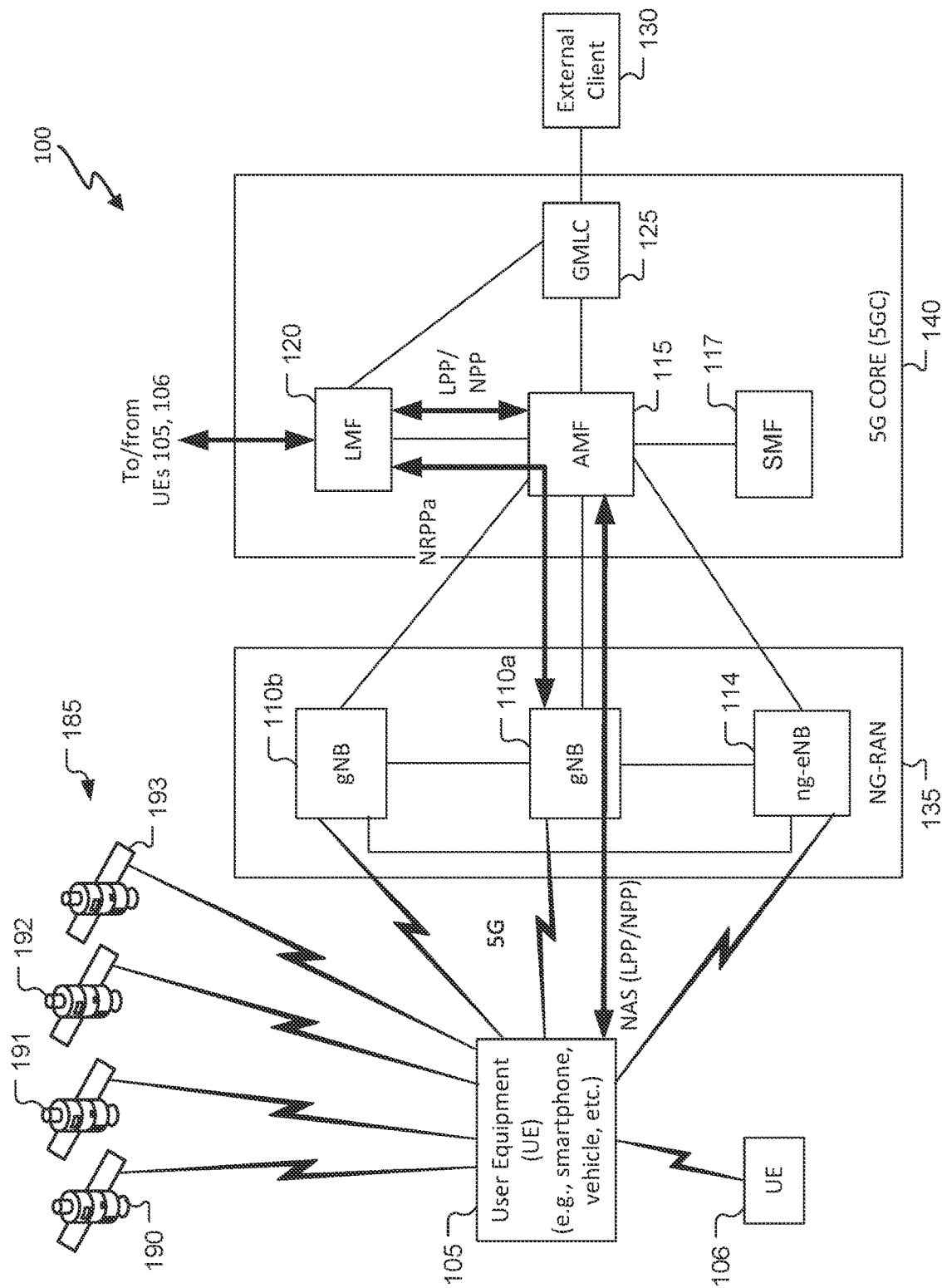
FIG. 1 is a simplified diagram of an example wireless communications system.

Techniques are discussed herein for determining position information of a mobile device using uplink signals and downlink signals (e.g., uplink PRS (positioning reference signals) and downlink PRS) reflected by RISes (reconfigurable intelligent surfaces). For example, downlink PRS may be sent from a base station to the mobile device and uplink PRS sent from the mobile device to the base station, with the downlink PRS being reflected by one RIS and the uplink PRS reflected by a different RIS. Timing of transmission and reception of the downlink PRS and the uplink PRS, separation of the RISes, direction of PRS travel from the RIS reflecting the downlink PRS to the mobile device may be used to determine a range between the mobile device and the RN reflecting the downlink PRS. This range and the direction of PRS travel may be used to determine location of the mobile device. Ranges from multiple RISes to the mobile device and locations of the RISes may be used to determine a location of the mobile device. Still other techniques are discussed herein.

Items and/or techniques described herein may provide one or more of the following capabilities, as well as other capabilities not mentioned. A location of a mobile device may be determined in scenarios of asymmetric uplink and downlink signal transfer between a base station and a mobile device via a RIS. Accuracy of location determination for a mobile device may be enhanced by providing ranging information determined using uplink and downlink signals transferred between a base station and a mobile device via separate RISes. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS), Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130, The SMF 117 may serve as an initial contact point of a Service Control Function (SCF) (not shown) to create, control, and delete media sessions. Base stations such as the gNBs 110a, 110b, and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the base stations, e.g., one or more of the gNBs 110a, 110b, and/or the ng-eNB 114 may be configured to communicate with the UE 105 via multiple carriers. Each of the gNBs 110a, 110b, and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include interact of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated, signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATS) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATS may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as UE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases. D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b*, and/or the ng-eNB 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP IS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP IS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signals) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a. UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the LIE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
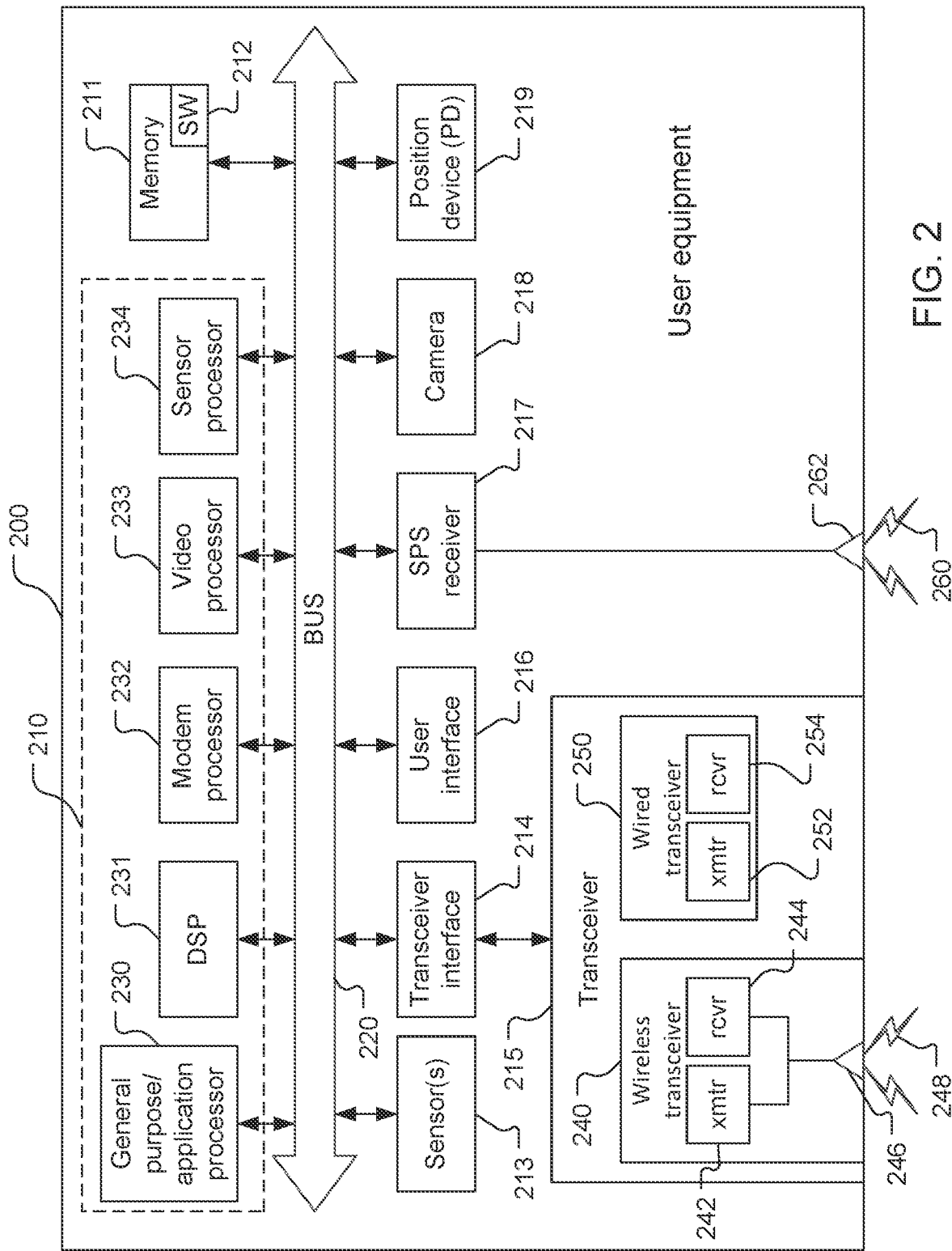
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination. etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by, the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. Alternatively, the magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATS) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), UE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
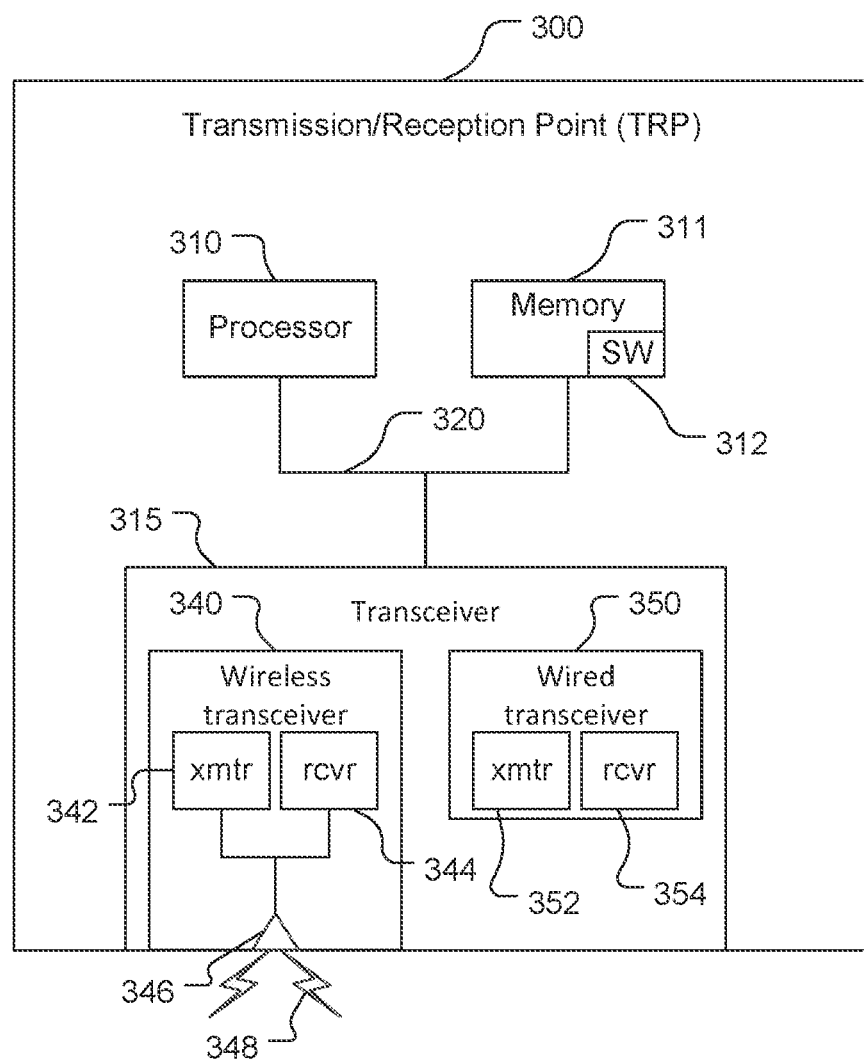
FIG. 3 is a block diagram of components of an example transmission/reception point.

Referring also to FIG. 3, an example of a TRP 300 of the gNBs 110a, 110b, and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b, and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
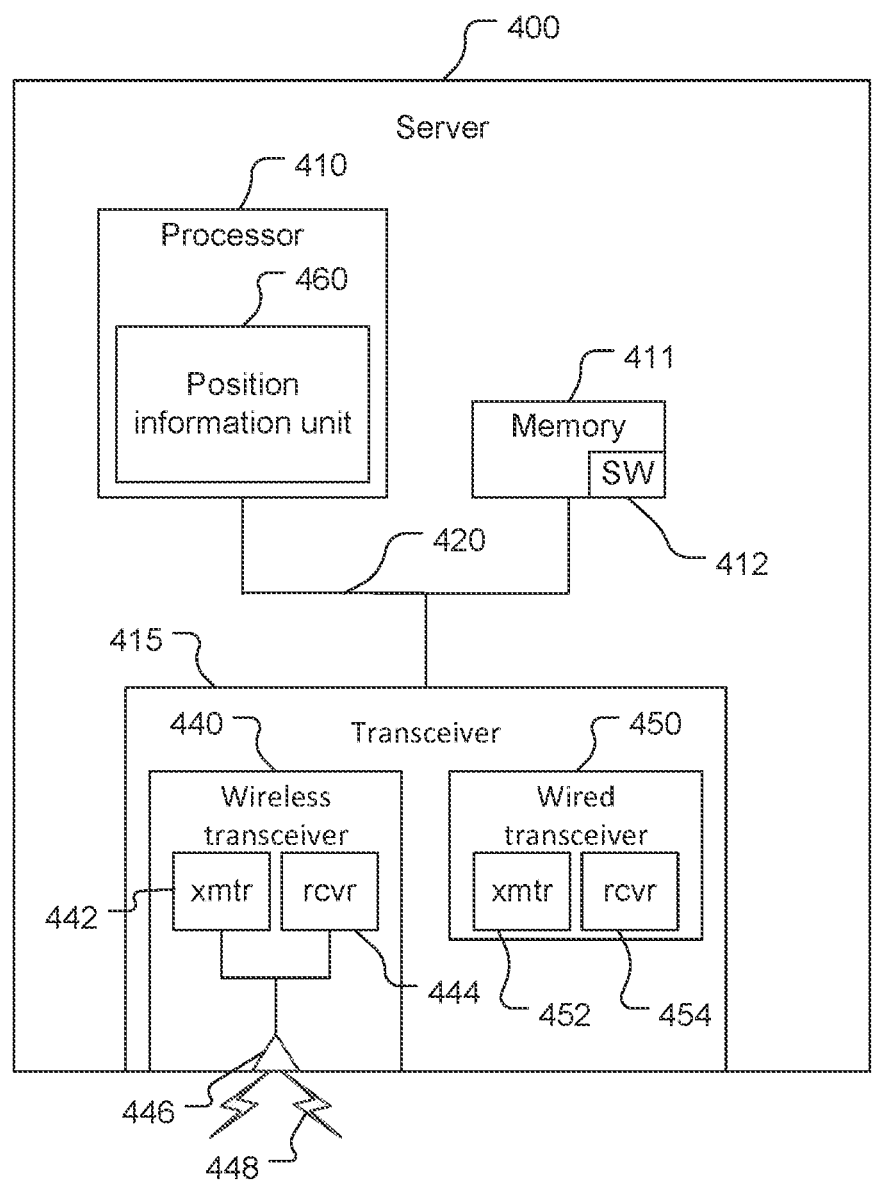
FIG. 4 is a block diagram of components of an example server, various embodiments of which are shown in FIG. 1.

Referring, also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATS) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), UE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., millliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth), E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information—Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Environments Using RIS Reflections

Figure 5:
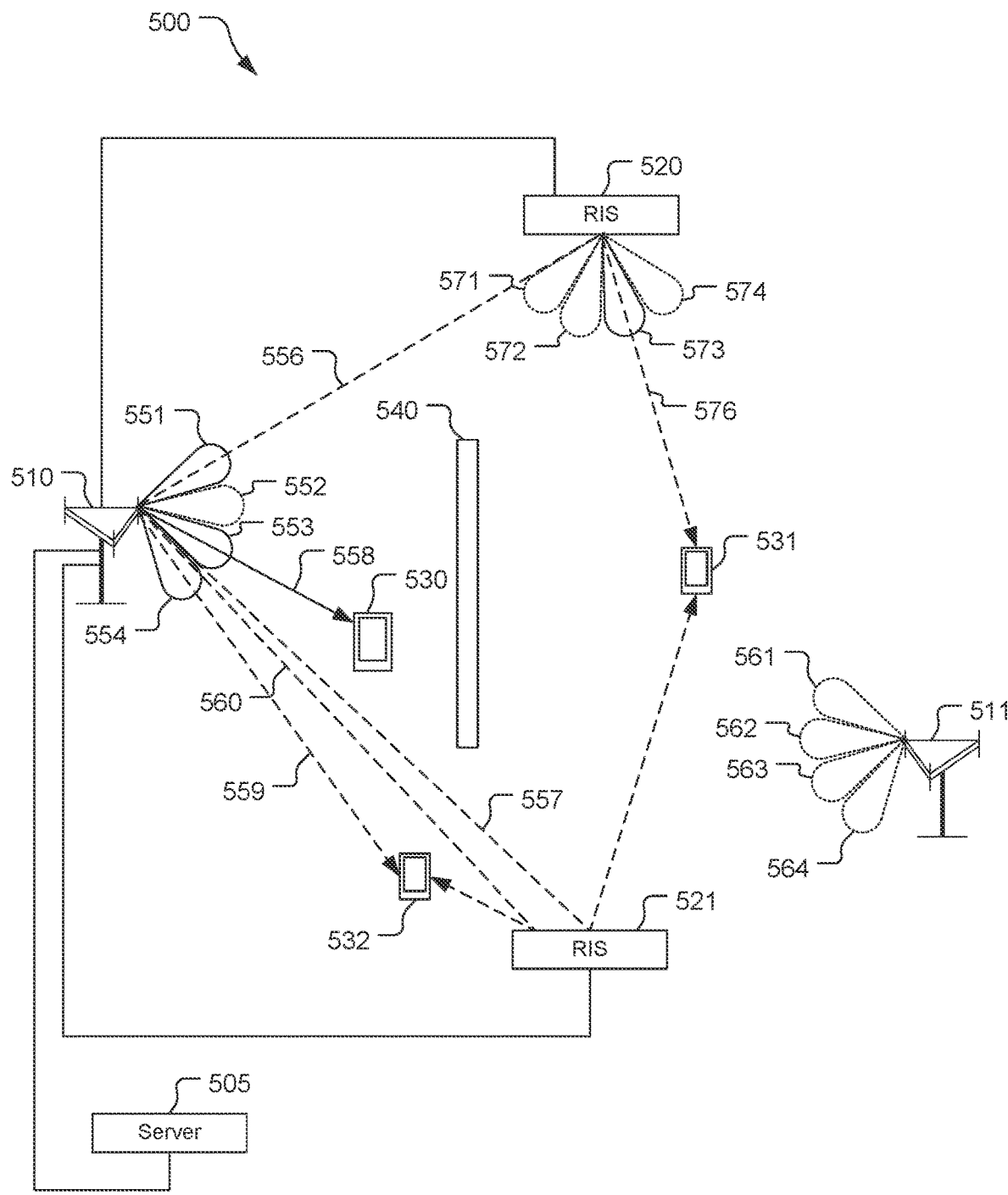
FIG. 5 is a simplified diagram of a wireless communication environment including RISes (reconfigurable intelligent surfaces).

Referring to FIG. 5, a wireless communication environment 500 includes a server 505, TRPs 510, 511, reconfigurable intelligent surfaces (RISes) 520, 521, UEs 530, 531, 532 and an obstacle 540 (e.g., a building or other object that inhibits/blocks RF signals). The server 505 may be an example of the server 400, the TRPs 510, 511 may be examples of the TRP 300, and the UEs 530, 531 may be examples of the UE 200 or examples of other UEs discussed herein. The TRPs 510, 511 and the UEs 530, 531 may be examples of a wireless signaling device discussed herein, e.g., a wireless signaling device 700. The TRPs 510, 511 are configured to communicate (send and/or receive wireless signals) with at least antenna beams 551, 552, 553, 554, 561, 562, 563, 564, respectively. The RISes 520, 521 are artificial structures with engineered electromagnetic (EM) properties. The RISes 520, 521 are configured to receive wireless signals from a transmitter (e.g., a base station or UE) and passively beamform and retransmit (e.g., without power amplification) the received signals via one or more beams, with the retransmitted signals referred to as reflected signals, toward a receiver (e.g., a base station or UE). A RIS can be configured to reflect an impinging signal to a desired direction. For example, each of the RISes 520, 521 may be dynamically configured to transmit the respective reflected signals toward one or more receivers such as one or more of the UEs 530-532. The RIS 520 is configured, in this example, to use antenna beams 571, 572, 573, 574 to send and/or receive wireless signals.

In the example illustrated in FIG. 5, the TRP 510 is connected to, and configured to control, the RISes 520, 521 to control the direction(s) of the reflected signals from the RISes 520, 521. As shown, the TRP 510 is unable to communicate directly with the UE 531 due to the obstacle 540 being disposed along be line of sight (LOS) direction between the TRP 510 and the UE 531 (e.g., the beam 552 from the TRP 510 to the UE 531). The UE 531 is disposed behind the obstacle 540 relative to the TRP 510 and thus unable to receive an LOS beam (the beam 552) from the TRP 510. The TRP 510 may be aware that the obstacle 540 creates a coverage hole, i.e., a geographic area in which signals from the TRP 510 cannot directly reach or may reach but be attenuated enough to make detection of the signal difficult or impossible by a UE within the coverage hole. In this scenario, the TRP 510 may bounce one or more signals off of one or more RISes into the coverage hole to provide coverage to devices in the coverage hole, including devices about which the TRP 510 is not currently aware. For example, the TRP 510 may use the beam 551 to send a signal 556 to the RIS 520, and control the RIS 520 to reflect the incoming signal into the beans 573 to transmit a reflected signal 576 toward the UE 531, thereby communicating with the UE 531 around the obstacle 540. The TRP 510 may configure the RIS 520 to reflect UL signals from the UE 531 into the beam 571 to the TRP 510. Similarly, the TRP 510 may send a signal 557 to the RIS 520, and control the RIS 520 to reflect the incoming signal toward the UE 531, thereby communicating with the UE 531 around the obstacle 540. As another example, the TRP 510 may send signals 558, 559 directly to the UEs 530, 532. As another example, the TRP 510 may send a signal 560 to the RIS 521, and control the RIS 521 to reflect the incoming signal 560 toward the UE 532 even though the TRP 510 can (and may) send one or more signals directly to the UE 532.

The environment 500 may be used to help with signal transfer between one or more TRPs and one or more low-tier (e.g., low-power, low-bandwidth, low-antenna-count, low baseband processing capability) UEs, such as an "NR light" UE or a reduced-capability UE (i.e., an "NR RedCap" UE), which may not have the capability to hear or detect a PRS transmitted from a non-serving TRP, especially from a TRP that is far from the UE. Likewise, an SRS for positioning measurement by a non-serving TRP of an SRS for positioning from a low-tier UE may be of lower quality than an SRS for positioning measurement from a UE that is not a low-tier UE. The use of one or more of the RISes 520, 521 may enable the transfer of one or more additional signals between the TRP 510 and the UE 531. The use of the RISes 520, 521 from a single TRP, here the TRP 510, may reduce or eliminate synchronization errors that may occur with multiple signals from multiple TRPs, which may help improve, for example, positioning accuracy based on signal transfer between the TRP 510 and the UE 531.

In some circumstances, a UE may be in a location that has asymmetrical downlink signal reception and uplink signal transmission using the same RIS. For example, the UE 531 may receive a downlink signal from the RIS 520 (and/or the RIS 521) with good quality (e.g., at least a threshold value of a quality metric such as RSRP) while an uplink signal sent from the UE 531 to the TRP 510 via the RIS 520 (and/or the RIS 521) is received by the TRP 510 with insufficient quality (e.g., insufficient power to measure the uplink signal at all or at least with a threshold accuracy). As another example, the UE 531 may receive a downlink signal from the RIS 520 (and/or the RIS 521) with insufficient quality while an uplink signal sent from the UE 531 to the TRP 510 via the RIS 520 (and/or the RIS 521) is received by the TRP 510 with good quality. Consequently, a RIS may be used to reflect an uplink signal from a UE, to a TRP and a different RIS used to reflect a downlink signal from the TRP to the UE.

Figure 6:
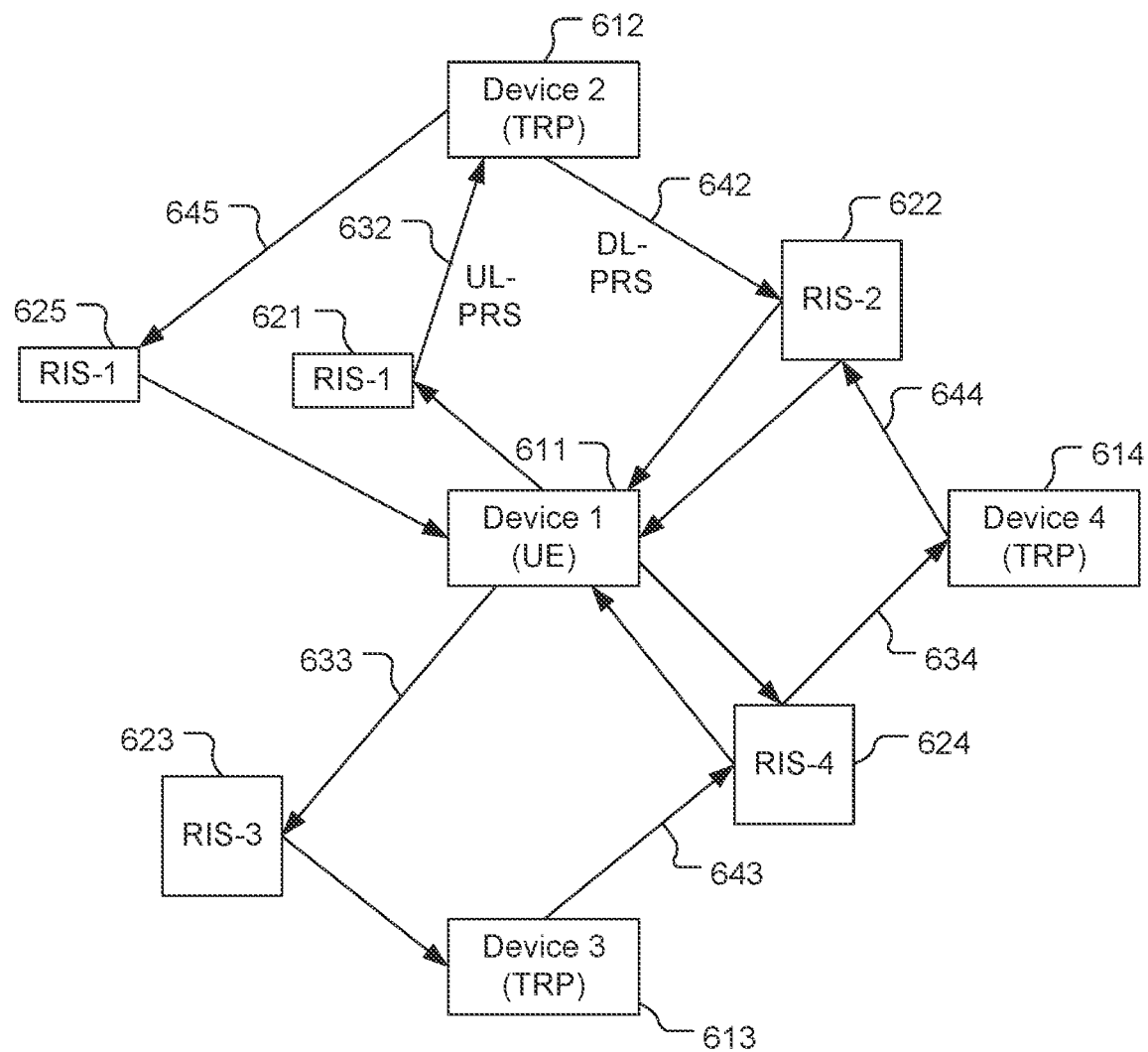
FIG. 6 is a simplified diagram of a wireless communication environment including multiple transmission/reception points, multiple RISes, and a target device.

Referring also to FIG. 6, a simplified environment 600 includes wireless signaling devices 611, 612, 613, 614, and RISes 621, 622, 623, 624, 625. In this example, the device 614 is a target UE (a UE whose location is desired to be determined) and the devices 611-613 are TRPs. In this example, arrows show signal transfer between the device 614 (target UE) and the devices 611-613 via respective ones of the RISes 621-625. As shown, the device 611 sends UL-PRS 632, 633, 634 to the devices 612, 613, 614, respectively, and receives DL-PRS 642, 643, 644, 645 from the devices 612, 613, 614, respectively. Signals other than those shown may also be transferred, e.g., one or more DL-PRS and/or one or more UL-PRS transferred directly between devices without reflection by a RIS, one or more other signals to and/or from one or more other devices (e.g., other TRP(s)). Also, one or more signals shown in FIG. 6 may not be transferred.

Figure 7:
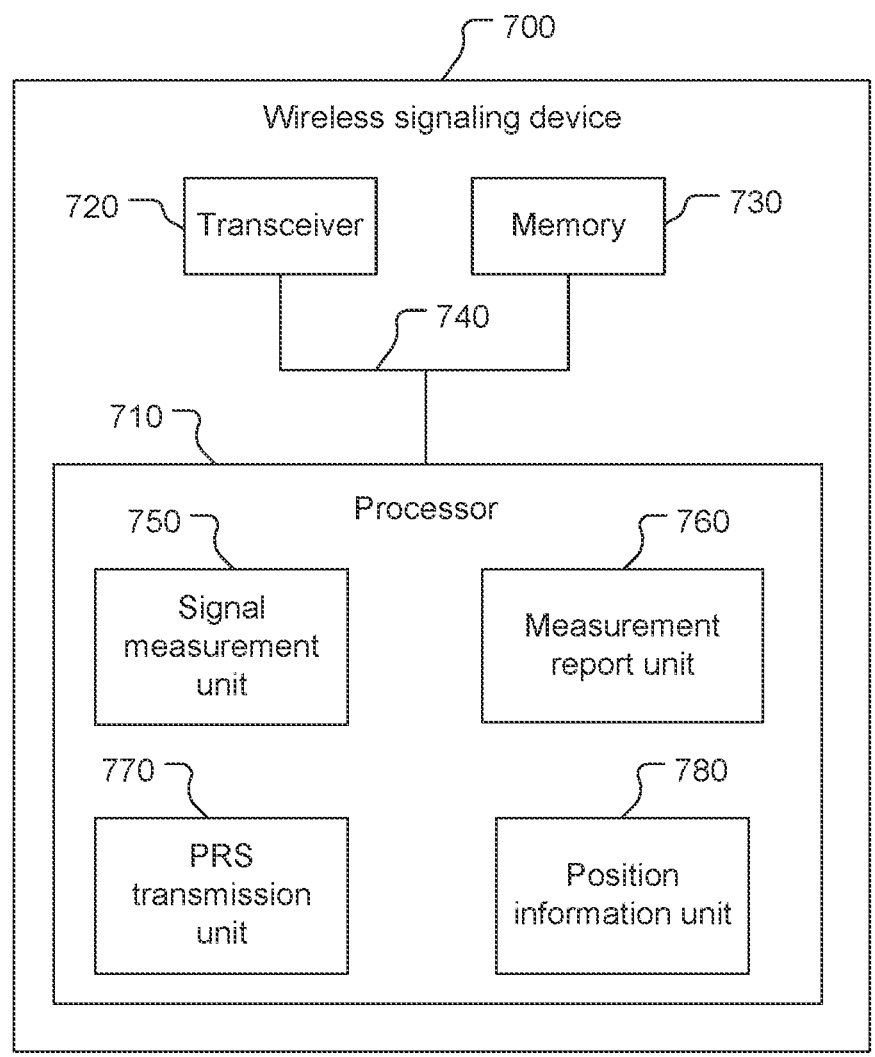
FIG. 7 is a simplified diagram of an example wireless signaling device.

Referring also to FIG. 7, a wireless signaling device 700 includes a processor 710, a transceiver 720, and a memory 730 communicatively coupled to each other by a bus 740. Each of the devices 611-614 is an example of the device 700. Thus, the device 700 may include the components shown in FIG. 7, and may include one or more other components such as any of those shown in FIG. 2, or any of the components shown in FIG. 3. For example, the processor 710 may include one or more of the components of the processor 210 or the processor 310. The transceiver 720 may include one or more of the components of the transceiver 215 or the transceiver 315, e.g., the wireless transmitter 242 (342) and the antenna 246 (346), or the wireless receiver 244 (344) and the antenna 246 (346), or the wireless transmitter 242 (342), the wireless receiver 244 (344), and the antenna 246 (346). Also or alternatively, the transceiver 720 may include the wired transmitter 252 (352) and/or the wired receiver 254 (354). The memory 730 may be configured similarly to the memory 211 (311), e.g., including software with processor-readable instructions configured to cause the processor 710 to perform functions.

The description herein may refer to the processor 710 performing a function, but this includes other implementations such as where the processor 710 executes software (stored in the memory 730) and/or firmware. The description herein may refer to the device 700 performing a function as shorthand for one or more appropriate components (e.g., the processor 710 and the memory 730) of the device 700 performing the function. The processor 710 (possibly in conjunction with the memory 730 and, as appropriate, the transceiver 720 and/or one or more other components of the device 700) may include a signal measurement unit 750, a measurement report unit 760, a PRS transmission unit 770, and/or a position information unit 780 (e.g., any single one of the units 750, 760, 770, 780 or any combination of two or more of the units 750, 760, 770, 780). The signal measurement unit 750, the measurement report unit 760, the PRS transmission unit 770, and the position information unit 780 are discussed further below, with the wireless signaling device configured to perform functions of the units 750, 760, 770, 780. The description may refer to the processor 710 generally, or the device 700 generally, as performing any of the functions of the signal measurement unit 750, the measurement report unit 760, the PRS transmission unit 770, and/or the position information unit 780. The PRS transmission unit 770 is configured to transmit PRS based on a schedule, e.g., provided by the server 400. The type of PRS that the PRS transmission unit 770 is configured to transmit may depend on the type of the device 700, e.g., DL-PRS if the device 700 is a TRP, and UL-PRS and SL-PRS (sidelink PRS) if the device 700 is a UE.

Figure 8:
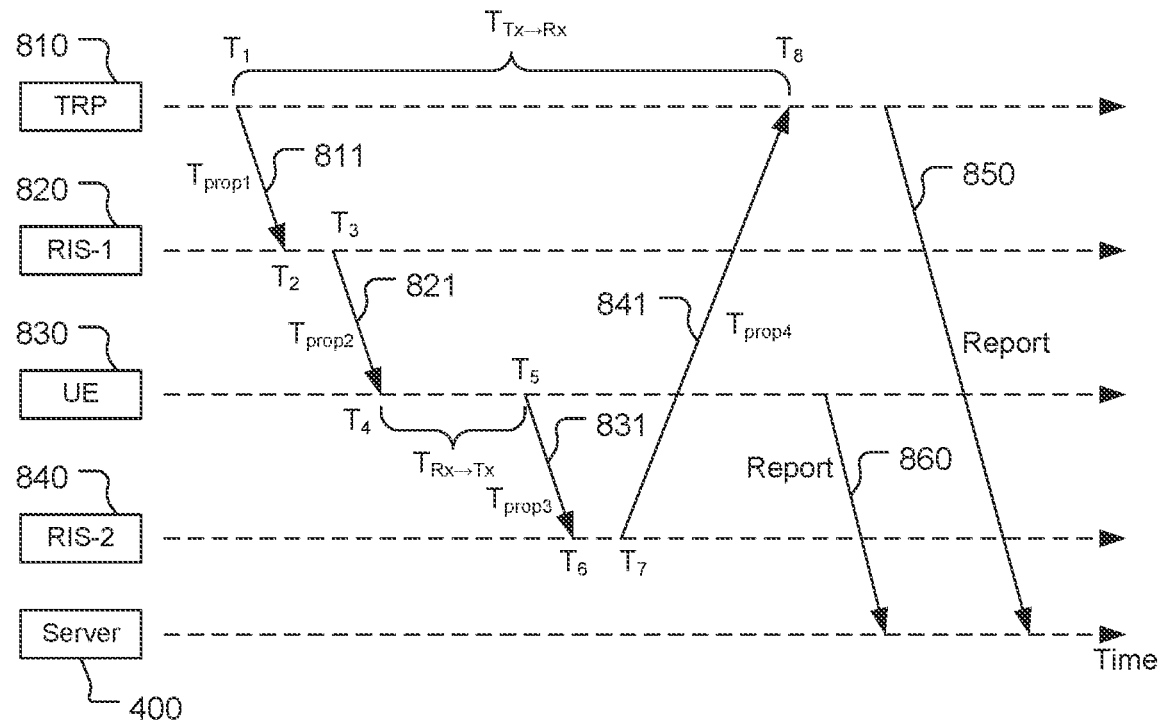
FIG. 8 is a timing diagram of a signaling loop initiated by a transmission/reception point.
Figure 9:
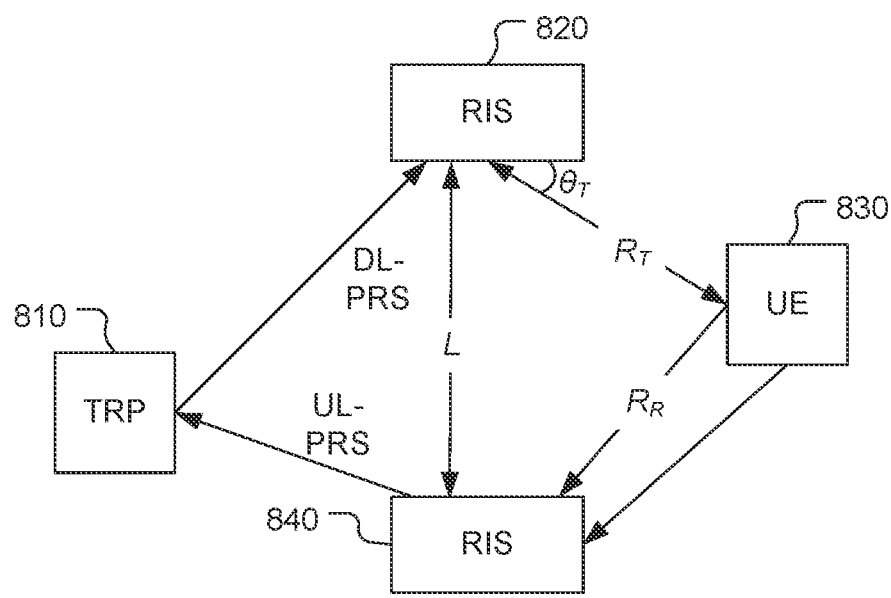
FIG. 9 is a simplified block diagram of the signaling loop shown in FIG. 8.
Figure 10:
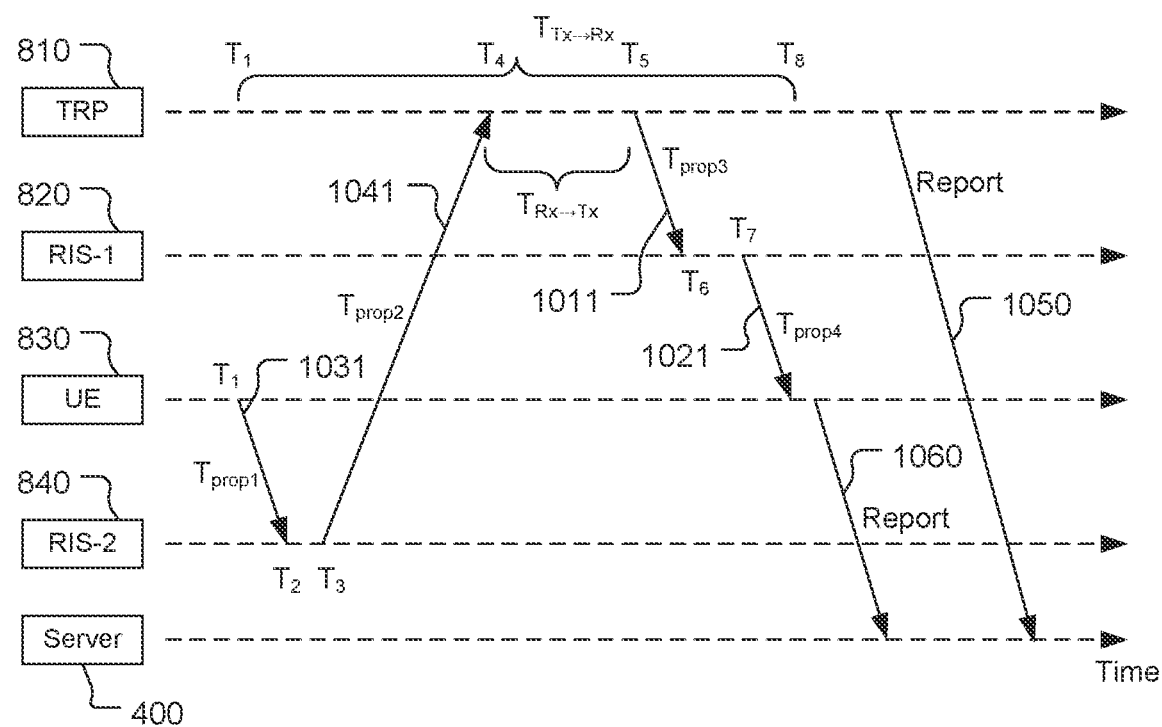
FIG. 10 is a timing diagram of a signaling loop initiated by a user equipment.

Referring also to FIGS. 8-10, multiple implementations of the device 700 may be used in conjunction with multiple RISes to transfer PRS to determine position information (e.g., one or more PRS measurements, one or more ranges (e.g., pseudoranges), and/or one or more location estimates) for a target device, e.g., a UE. For example, a UE implementation of the device 700 may be used as the device 611 and a TRP implementation of the device 700 may be used as the devices 612-614 and a loop of signaling may be produced between a UE and a TRP via multiple RISes. FIG. 8 illustrates a scenario where a signaling loop begins and ends with a TRP and FIG. 10 illustrates a scenario where a signaling loop begins and ends with a UE.

As shown in FIG. 8, a TRP 810 initiates a signaling loop at a time $T_1$ by sending a DL-PRS 811 to a RIS 820. For example, the PRS transmission unit 770 of the TRP 810 transmits the DL-PRS 811 via the transceiver 720 (e.g., the wireless transmitter 342 and the antenna 346). The DL-PRS 811 travels for a propagation time $T_{prop1}$ from the TRP 810 to the RIS 820, arriving at a time $T_2$. The RIS 820 reflects the DL-PRS 811 at a time $T_3$ as DL-PRS 821 to a UE 830, with the DL-PRS 821 travelling for a propagation time $T_{prop2}$ from the RIS 820 to the UE 830, and arriving at the UE 830 at a time $T_4$. The time difference (group delay) between the time $T_2$ and the time $T_3$ is typically negligible and may be ignored or could be estimated/calculated. The UE 830 receives the DL-PRS 821, e.g., the processor 710 of the UE 830 receives the DL-PRS 821 via the transceiver 215 (e.g., the wireless receiver 244 and the antenna 246). The signal measurement unit 750 of the UE 830 may measure the DL-PRS 821, e.g., to determine the time of arrival $T_4$. The signal measurement unit 750 of the UE 830 may be used to measure a reference signal (e.g., PRS, CSI-RS, etc.) to determine a beam of the RIS 820 from which the strongest (e.g., highest RSRP) signal is received by the UE 830. The measurement report unit 760 of the UE 830 may report this beam information to the TRP 810 and/or the server 400 such that the TRP 810 can control the RIS 820 to use that beam to transmit the DL-PRS 821. The PRS transmission unit 770 of the UE 830 is configured to respond to receipt of the DL-PRS 821 by sending a corresponding UL-PRS 831. Here, the UE 830 transmits the UL-PRS 831 at a time $T_5$ to a RIS 840, with the UL-PRS 831 travelling for a propagation time $T_{prop3}$ from the UE 830 to the RIS 840, and arriving at the RIS 840 at a time $T_6$. The RIS 840 reflects the UL-PRS 831 at a time $T_7$ as UL-PRS 841 to the TRP 810, with the UL-PRS 841 travelling for a propagation time $T_{prop4}$ from the RIS 840 to the TRP 810, and arriving at the TRP 810 at a time $T_8$. The time difference (group delay) between the time $T_6$ and the time $T_7$ is typically negligible and may be ignored or could be estimated/calculated. The TRP 810 receives the UL-PRS 841, e.g., the processor 710 of the UE 830 receives the DL-PRS 841 via the transceiver 315 (e.g., the wireless receiver 344 and the antenna 346). The signal measurement unit 750 of the UE 830 may measure the DL-PRS 811, e.g., to determine the time of arrival $T_8$.

The measurement report unit 760 of the TRP 810 may be configured to report one or more indications of a transmission-to-reception time from transmission of the DL-PRS 811 at the time $T_1$ to reception of the UL-PRS 841 at the time $T_8$. The measurement report unit 760 may be configured to send a report 850 to the server 400, with the report 850 including at least one time corresponding to the transmit time $T_1$ and the reception time $T_8$. For example, the measurement report unit 760 may be configured to report the transmission-to-reception time, i.e., a time difference TRP-$T_{Rx\text{-}Tx}$ between the transmit time $T_1$ and the reception time $T_8$. Also or alternatively, the measurement report unit 760 may be configured to report the transmit time $T_1$ and the reception time $T_8$. As another example, the measurement report unit 760 may be configured to report the reception time $T_8$, with the transmit time $T_1$ being known by the server 400 due to being scheduled in assistance data provided to the TRP 810. The report 850 may be indicative of the DL-PRS 811 and the UL-PRS 841 and the server 400 may use this information to determine position information (e.g., range, location, etc.) for the UE 830, e.g., by using RIS locations corresponding to the DL-PRS 811 and the UL-PRS 841 and an AoD associated with the DL-PRS 811 (e.g., as discussed further herein).

The measurement report unit 760 of the TRP 810 may be configured to report the propagation times $T_{prop1}$, $T_{prop4}$ between the TRP 810 and the RISes 820, 840, respectively. The locations of the RISes 820, 840 may be known to the TRP 810 (e.g., sent to the TRP 810, programmed into the memory 730 of the TRP 810, etc.) and the location of the TRP 810 known (e.g., programmed into the memory 730, determined by SPS calculation, etc.). The processor 710 may be configured to determine the ranges to the RISes 820, 840, e.g., by calculating the ranges based on the locations of the RISes 820, 840 and the location of the TRP 810, or by retrieving the ranges from the memory 730.

The measurement report unit 760 of the UE 830 may be configured to report one or more indications of a transition time from reception of the DL-PRS 821 at the time $T_4$ to transmission of the UL-PRS 831 at the time $T_5$. The measurement report unit 760 may be configured to send a report 860 to the server 400 with the report 860 including at least one time corresponding to the reception time $T_4$ and the transmit time $T_5$. For example, the measurement report unit 760 may be configured to report the transition time, i.e., a time difference UE-$T_{Rx\text{-}Tx}$ between the reception time $T_4$ and the transmit time $T_5$. Also or alternatively, the measurement report unit 760 may be configured to report the reception time $T_4$ and the transmit time $T_5$. The report 860 may be indicative of the DL-PRS 821 and the UL-PRS 831.

The server 400 may be configured to determine position information for the UE 830 based on the reports 850, 860. For example, the position information unit 460 may be configured to determine a range $R_T$ between the RIS 820 and the UE 830 according to Equation (1) below.

$$R_T = R_{sum} - \frac{R_{sum}^2 - L^2}{2(R_{sum} + L*\cos\theta_T)} \quad (1)$$

-continued $$R_{sum} = R_T + R_R \quad (2)$$

$$R_R = \frac{R_{sum}^2 - L^2}{2(R_{sum} + L*\cos\theta_T)} \quad (3)$$

where, as shown in FIG. 9, $R_R$ is the range between the UE 830 and the RN 840, L is the distance between the RIS 820 and the RIS 840, and $\theta_T$ is the AoD from the RIS 820 to the UE 830. The AoD $\theta_T$ may be estimated by RSRP measurements reported by the UE 830. For example, the UE 830 may measure powers of multiple beams from the RIS 820 and the UE 830, determine a normalized vector of the measured powers, compare this vector with a matrix of normalized powers corresponding to various AoDs, and determine the AoD as the angle corresponding to the vector, of the matrix, that most closely corresponds to the normalized vector of measured powers (or using interpolation and the two closest vectors of the matrix). The value of $R_{sum}$ can be estimated using Equation (4) below.

$$R_{sum} = c*(\text{TRP-}T_{Rx\text{-}Tx}-\text{UE-}T_{Rx\text{-}Tx}-T_{prop1}-T_{prop4}) \quad (4)$$

where c is the speed of light, TRP-$T_{Rx\text{-}Tx}$ is the time from transmission of the DL-PRS 811 to reception of the UL-PRS 841, i.e., $T_8-T_1$. If the group delay in any of the RISes is non-negligible, then the group delay(s) in the RIS(es) may be compensated, e.g., by subtracting the group delay(s) from the transmission time TRP-$T_{Rx\text{-}Tx}$ in Equation (4).

The position information unit 780 may be configured to determine a location estimate of the UE 830. For example, the position information unit 780 may determine a location estimate of the UE 830 based on the known location of the RIS 820, the determined range $R_T$, and the AoD $\theta_T$. Also or alternatively, the position information unit 780 may be configured to determine a location estimate of the UE 830 using trilateration and determined ranges between the UE 830 and multiple RISes reflecting DL signals from one or more TRPs (e.g., the RISes 622, 624, 625 shown in FIG. 6). Also or alternatively, the position information unit 780 may be configured to determine a location estimate of the UE 830 using trilateration based on ranges to multiple uplink RISes determined using Equation (3), and known locations of the uplink RISes. Also or alternatively, the position information unit 780 may be configured to determine a location estimate of the UE 830 using Equation (3) and an AoA of the UL-PRS 831 received from the UE 830 at the RIS 840. Also or alternatively, the position information unit 780 may be configured to determine a location estimate of the UE 830 using trilateration and ranges to one or more DL RISes and one or more UL RISes. The position information unit 780 may determine the location of the UE 820 using trilateration ranges determined from signal transfer with multiple TRPs without high-level (e.g., less than 10 ns) synchronization of the TRPs. For example, TRP synchronization of 50 ns or less may be sufficient.

As shown in FIG. 10, the UE 820 initiates a signaling loop by sending a UL-PRS 1031 to the RIS 840. For example, the PRS transmission unit 770 of the UE 830 transmits the UL-PRS 1031 via the transceiver 720 (e.g., the wireless transmitter 242 and the antenna 246). Here, the UE 830 transmits the UL-PRS 1031 at a time $T_1$ to the RIS 840, with the UL-PRS 1031 travelling for a propagation time $T_{prop1}$ from the UE 830 to the RIS 840, and arriving at the RIS 840 at a time $T_2$. The RIS 840 reflects the UL-PRS 1031 at a time $T_3$ as UL-PRS 1041 to the TRP 810, with the UL-PRS 1041 travelling for a propagation time $T_{prop2}$ from the RIS 840 to the TRP 810, and arriving at the TRP 810 at a time $T_4$. The PRS transmission unit 770 of the TRP 810 responds to reception of the UL-PRS 1041 by transmitting a DL-PRS 1011 via the transceiver 720 (e.g., the wireless transmitter 342 and the antenna 346) at a time $T_5$. The DL-PRS 1011 travels for a propagation time $T_{prop3}$ from the TRP 810 to the RIS 820, arriving at a time $T_6$. The RIS 820 reflects the DL-PRS 1011 at a time $T_7$ as DL-PRS 1021 to the UE 830, with the DL-PRS 1021 travelling for a propagation time $T_{prop4}$ from the RIS 820 to the UE 830, and arriving at the UE 830 at a time $T_8$. The propagation times $T_{prop2}$, $T_{prop3}$ between the TRP 810 and the RISes 820, 840, one or more indications of a transition time from reception of the UL-PRS 1031 at the time $T_4$ to transmission of the DL-PRS 1011 at the time $T_5$, the transmit time $T_1$, and the reception time $T_8$ s are sent by the TRP 810 and the UE 830, respectively, in respective reports 1050, 1060 to the server 400. The report 1060 may, for example, comprise the time difference $T_8$-$T_1$ between transmission of the UL-PRS 1031 and reception of the DL-PRS 1021, and/or the transmit time $T_1$ and the reception time $T_8$, or possibly just the reception time $T_8$, with the transmit time $T_1$ being known by the server 400 due to being scheduled in assistance data provided to the UE 830. The server 400 may determine position information (e.g., location estimate) for the UE 830 using Equation (1) or (3) above and Equation (5) (instead of Equation (4)).

$$R_{sum} = c*(\text{TRP-}T_{Rx\text{-}Tx} - \text{UE-}T_{Rx\text{-}Tx} - T_{prop1} - T_{prop4}) \qquad (5)$$

where TRP-$T_{Rx\text{-}Tx}$ is the time difference between the reception time $T_4$ and the transmit time $T_5$ (i.e., the time taken by the TRP 810 to send the DL-PRS 1011 in response to receiving the UL-PRS 1041), and UE-$T_{Rx\text{-}Tx}$ is the time from transmission of the UL-PRS 1031 to reception of the DL-PRS 1021, i.e., $T_8$-$T_1$.

Each PRS may be associated with a RIS used to reflect the PRS to facilitate determining position information for a UE using and DL-PRS and UL-PRS reflected by different RISes, e.g., to facilitate associating the appropriate propagation times distance L between RISes, and AoD $\theta_T$ with PRS measurements to facilitate use of Equations (1)-(3) or Equations (1)-(2) and (4) to determine corresponding position information. A measurement report may include indications of measurements of PRS reflected by different RISes for downlink and uplink and the measurement indications may identify or otherwise be associated with the RISes that reflected the PRS. So that the measurements may be associated with the appropriate RIS, different PRS reflected by different RISes are configured differently and associated with corresponding RISes. One or more of various techniques may be used to differentiate PRS and to associate different PRS with corresponding RISes. For example, a RIS ID (RIS identity) may be included in the PRS that identifies the RIS used to reflect the PRS. The RIS IDs may be provided to the UE in assistance data, e.g., along with a schedule of DL-PRS resources and UL-PRS resources. As another example, the PRS could have a sequence that is unique to, and associated with, the RIS used to reflect the PRS, e.g., the PRS could be scrambled using the RIS ID, As another example, different PRS configurations, e.g., time and frequency combinations, may be associated with (e.g., assigned to) different RISes. As another example, different PRS may have different codebooks applied to the PRS (even if the different PRS have the same sequence, same timing, and same frequency) to weight the PRS differently.

Figure 11:
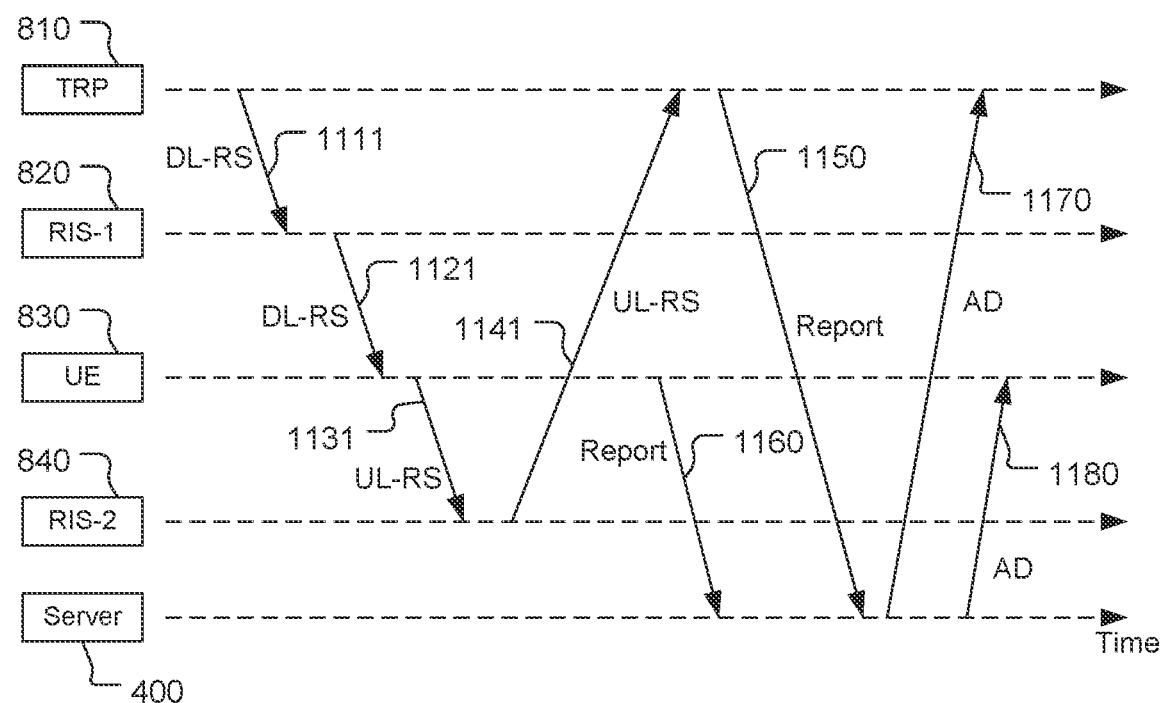
FIG. 11 is a simplified diagram of reference signal transfer and reporting.

The server 400 may be configured to determine which RISes to use for reflecting PRS for signal transfer between a TRP and a UE. For example, the server 400 may be configured to select the RISes based on reference signal measurements provided by the UE and/or the TRP, e.g., to select RISes from which reference signals are received with good quality. As another example, the TRP may, based on one or more reference signal measurements, determine a particular RIS from which a good-quality UL reference signal (UL-RS) is received and send a message to the server to request that the server 400 selects the particular RIS for reflecting the appropriate signal. Also or alternatively, the UE may determine a RES from which a DL reference signal (DL-RS) was received with good quality and send a message to the server requesting the server to select. that RTS for reflecting DL-PRS to the UE. For example, referring also to FIG. 11, the TRP 810 may send a DL-RS 1111 to the RIS 820 that, in turn, reflects the DL-RS 1111 as a DL-RS 1121 to the UE 830, and the UE 830 may send a UL-RS 1131 to the RIS 840 that, in turn, reflects the UL-RS 1131 as a UL-RS 1141 to the TRP 810. The reference signals 1111, 1131 may be sent independently of each other (e.g., the UE 830 may send the UL-RS 1131 regardless of receipt of the DL-RS 1121, and thus not in response to receiving the DL-RS 1121). The TRP 810 may send the reference signal 1111 before or after the UE 830 sends the UK-RS 1131. The TRP 810 may send an indication of measurement of the UL-RS 1141 to the server 400 in a report 1150. The TRP 810 may measure UL-RS from multiple RISes from the UE 830 (e.g., as with the RISes 520, 521 and the TRP 510 shown in FIG. 5) and may include in the report 1150 a request for use of the RIS 840 for UL-PRS from the UE 830. The UE 830 may send an indication of measurement of the DL-RS 1121 to the server 400 in a report 1160. The UE 830 may measure DL-RS from multiple RISes from the TRP 810 (e.g., as shown in FIG. 5, or as shown with RISes 622, 625 in FIG. 6) and may include in the report 1160 a request for use of the RIS 820 for DL-PRS from the TRP 810. The server 400 is configured to schedule PRS based on the selected RIS(es), e.g., scheduling PRS resources that are associated with respective RISes. The server 400 may provide assistance data 1170 to the TRP 810 and/or assistance data 1180 to the UE 830 (directly and/or indirectly via the TRP 810). The assistance data 1170, 1180 may include a DL-PRS schedule and a UL-PRS schedule, may include one or more indications of the RIS(es) to be used, and/or may include one or more RIS IDs.

Figure 12:
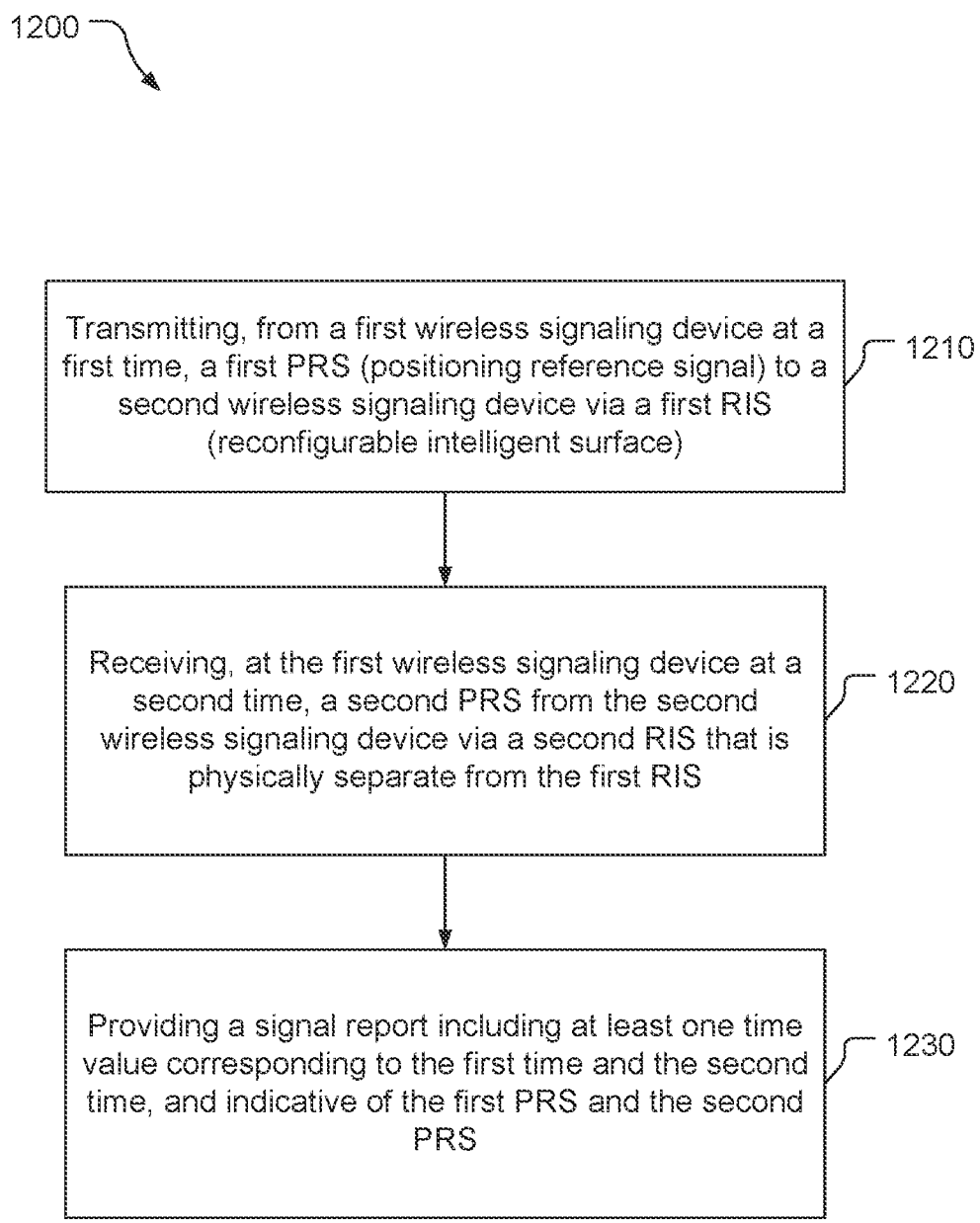
FIG. 12 is a block flow diagram of a signal reporting method for facilitating determination of position information.

Referring to FIG. 12, with further reference to FIGS. 1-11, a signal reporting method 1200 includes the stages shown. The method 1200 is, however, an example and not limiting. The method 1200 may be altered, e.g., by having stages added, removed, rearranged, combined, performed concurrently, and/or having single stages split into multiple stages.

At stage 1210, the method 1200 includes transmitting, from a first wireless signaling device at a first time, a first PRS to a second wireless signaling device via a first RTS. For example, the TRP 810 sends the DL-PRS 811 (or the DL-PRS 1011) to the UE 830 via the RIS 820. As another example, the UE 820 sends the UL-PRS 831 (or the UL-PRS 1031) to the TRP 810 via the RIS 840. The processor 710, possibly in combination with the memory 730, in combination with the transceiver 720 (e.g., the wireless transmitter 342 and the antenna 346 or the wireless transmitter 242 and the antenna 246) may comprise means for transmitting the first PRS.

At stage 1220, the method 1200 includes receiving, at the first wireless signaling device at a second time, a second PRS from the second wireless signaling device via a second RIS that is physically separate from the first RIS. For example, the TRP 810 receives the UL-PRS 841 (or the UL-PRS 1041) from the UE 830 via the RIS 840. As another example, the UE 820 receives the DL-PRS 821 (or the UL-PRS 1021) from the TRP 810 via the RIS 820. The processor 710, possibly in combination with the memory 730, in combination with the transceiver 720 (e.g., the antenna 346 and the wireless receiver 344 or the antenna 246 and the wireless receiver 244) may comprise means for receiving the second PRS.

At stage 1230, the method 1200 includes providing a signal report including at least one time value corresponding to the first time and the second time, and indicative of the first PRS and the second PRS. For example, the TRP 810 sends the report 850 indicating the transmission time $T_1$ and the reception time $T_8$ (or the report 1050 indicating the reception time $T_4$ and the transmission time $T_5$). As another example, the UE 830 sends the report 860 indicating the reception time $T_4$ and the transmission time $T_5$ (or the report 1060 indicating the transmission time $T_1$ and the reception time $T_8$). The signal report may be transmitted to another device, e.g., if the first wireless signaling device is a UE, or within a device, e.g., if the first wireless signaling device is an integrated TRP and server. The processor 710, possibly in combination with the memory 730, possibly in combination with the transceiver 720 (e.g., the wireless transmitter 342 and the antenna 346 or the wireless transmitter 242 and the antenna 246) may comprise means for providing the signal report.

Implementations of the method 1200 may include one or more of the following features. In an example implementation, the method 1200 comprises transmitting, to a server, a request for the second wireless signaling device to transmit the second PRS to the second RIS in order to transmit the second PRS to the first wireless signaling device. For example, the TRP 810 may send the report 1150 requesting the RIS 840 be used to send the UL-PRS 841, 1041 based on measurement of the UL-RS 1141. As another example, the UE 830 may send the report 1160 requesting the RIS 820 be used to send the DL-PRS 821, 1021 based on measurement of the DL-RS 1121. The processor 710, possibly in combination with the memory 730, possibly in combination with the transceiver 720 (e.g., the wireless transmitter 342 and the antenna 346 or the wireless transmitter 242 and the antenna 246) may comprise means for transmitting the request. In another example implementation, the method 1200 comprises: receiving, at the first wireless signaling device, a first reference signal from the second wireless signaling device via the second RIS; and receiving, at the first wireless signaling device, a second reference signal from the second wireless signaling device via a third RIS that is separate from the second RIS; where the request for the second wireless signaling device to transmit the second PRS to the second RIS is transmitted based on a first quality metric of the first reference signal at the first wireless signaling device being better than a second quality metric of the second reference signal at the first wireless signaling device. For example, the TRP 810 measures reference signals from multiple RISes (e.g., the RISes 520, 521) and requests the RIS from which the higher-quality RS is received to be used for reflecting PRS to the TRP 810. As another example, the UE 830 measures reference signals from multiple RISes (e.g., the RISes 520, 521) and requests the RIS from which the higher-quality RS is received to be used for reflecting PRS to the UE 830. The third RIS could be the first RIS or another RIS. The processor 710, possibly in combination with the memory 730, in combination with the transceiver 720 (e.g., the antenna 346 and the wireless receiver 344 or the antenna 246 and the wireless receiver 244) may comprise means for receiving the first RS and means for receiving the second RS.

Also or alternatively, implementations of the method 1200 may include one or more of the following features. In an example implementation, the first PRS is transmitted in response to receiving the second PRS. For example, the UE 830 transmits the UL-PRS 831 in response to receiving the DL-PRS 821. As another example, the TRP 810 transmits the DL-PRS 1011 in response to receiving the UL-PRS 1041. In another example implementation, the at least one time value comprises a time difference between the first time and the second time. For example, the report 850 may include the time difference $T_8-T_1$, or the report 860 may include the time difference $T_5-T_4$, or the report 1050 may include the time difference $T_5-T_4$, or the report 1060 may include the time difference $T_8-T_1$.

Figure 13:
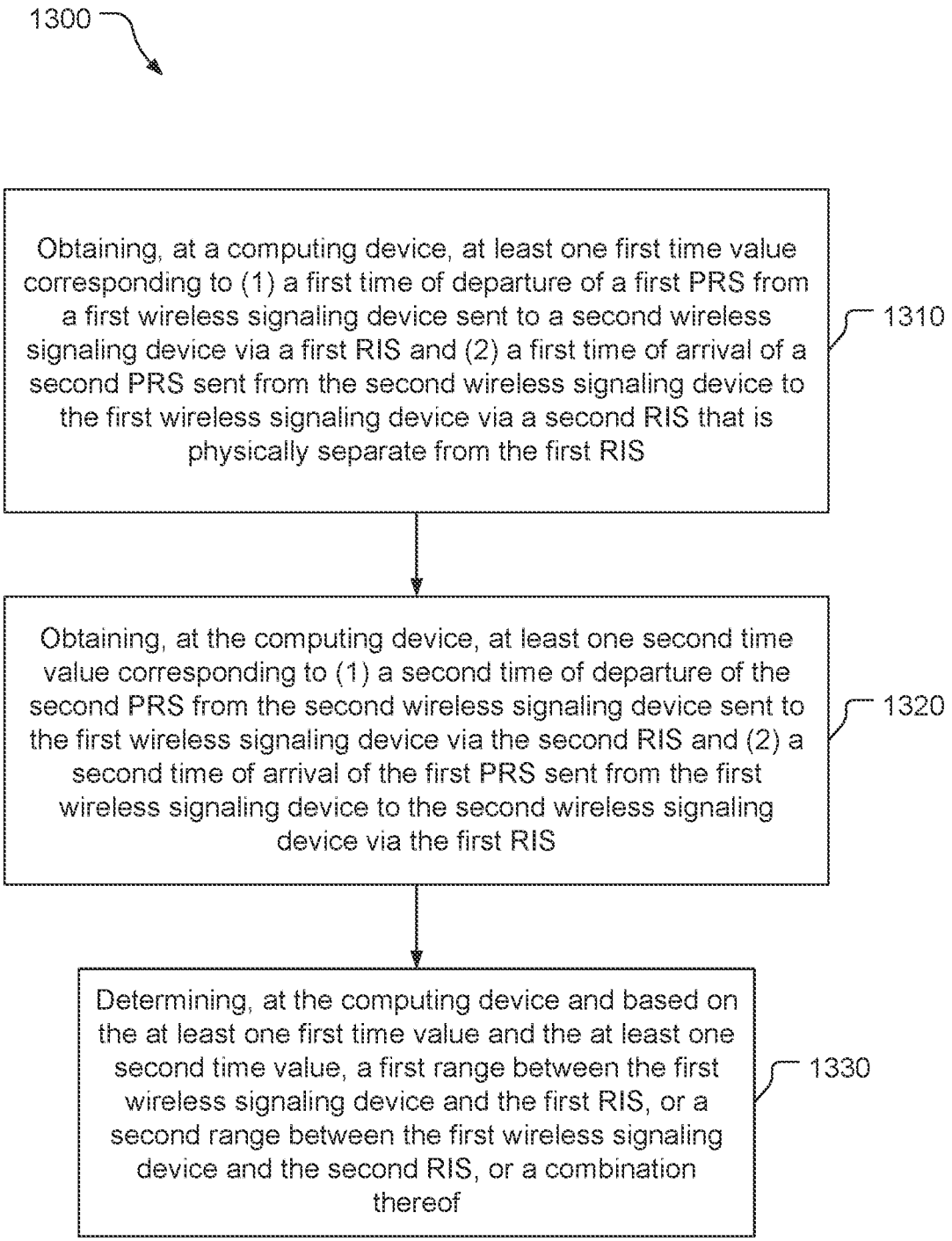
FIG. 13 is a block flow diagram of a position information determining method.

Referring to FIG. 13, with further reference to FIGS. 1-11, a method 1300 for facilitating determination of position information includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes obtaining, at a computing device, at least one first time value corresponding to (1) a first time of departure of a first PRS from a first wireless signaling device sent to a second wireless signaling device via a first RIS and (2) a first time of arrival of a second PRS sent from the second wireless signaling device to the first wireless signaling device via a second RIS that is physically separate from the first RIS. For example, the server 400 may receive (e.g., via the transceiver 415 from a physically-separate TRP or via an internal connection from a TRP that is integrated with the server 400) signal timing information, e.g., from the report 1060. The computing device may be a device other than the server 400, e.g., such as a UE, but the server 400 is used as an example for the discussion herein. Also, the example discussed herein is of the signal transfer shown in FIG. 10, although other signal transfers (such as that shown in FIG. 8) may be used. The server 400 may, for example, receive indications of the times $T_1$ and $T_8$, and/or an indication of the time difference $T_8-T_1$. The processor 410, possibly in combination with the memory 411, possibly in combination with the transceiver 415 (e.g., the antenna 446 and the wireless receiver 444 or the wired receiver 454) may comprise means for obtaining the at least one first time value.

At stage 1320, the method 1300 includes obtaining, at the computing device, at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS. For example, the server 400 may receive signal timing information, e.g., from the report 1050. The server 400 may, for example, receive indications of the times $T_4$ and $T_5$, and/or an indication of the time difference $T_5-T_4$. The processor 410, possibly in combination with the memory 411, possibly in combination with the transceiver 415 (e.g., the antenna 446 and the wireless receiver 444 or the wired receiver 454) may comprise means for obtaining the at least one second time value.

At stage 1330, the method 1300 includes determining, at the computing device and based on the at least one first time value and the at least one second time value, a first range between the first wireless signaling device and the first RIS, or a second range between the first wireless signaling device and the second RIS, or a combination thereof. For example, the position information unit 460 may use the obtained timing information to calculate a range from the RIS 820 to the UE 830 using Equations (1) and (5), and/or a range from the RIS 840 to the UE 830 using Equations (3) and (5). The processor 410, possibly in combination with the memory 411, may comprise means for determining the first range, or the second range, or a combination thereof.

Implementations of the method 1300 may include one or more of the following features. In an example implementation, the method 1300 comprises determining a location of the first wireless signaling device based on: the first range and a first angle of departure of the first PRS from the first wireless signaling device; or the first range and a first angle of arrival of the first PRS at the first RIS; or the second range and a second angle of departure of the second PRS from the second RIS; or the second range and a second angle of arrival of the second PRS at the first wireless signaling device; or any combination thereof. For example, the position information unit 460 may use range between the UE 830 and the RIS 820, or between the UE 820 and the RIS 840, and angle of departure or arrival, as appropriate, to determine location of the UE 830. In another example implementation, the method 1300 comprises: obtaining, at the computing device, at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RIS that is physically separate from the third RIS; obtaining, at the computing device, at least one fourth time value corresponding to (1) a fourth time of departure of the fourth PRS from the third wireless signaling device sent to the first wireless signaling device via the fourth RIS and (2) a fourth time of arrival of the third PRS sent from the first wireless signaling device to the third wireless signaling device via the third RIS; determining, at the computing device and based on the at least one third time value and the at least one fourth time value, a third range between the first wireless signaling device and the third RIS, or a fourth range between the first wireless signaling device and the fourth RIS, or a combination thereof; and determining, at the computing device, a location of the first wireless signaling device based on (1) the first range, or the second range, or a combination thereof and (2) the third range, or the fourth range, or a combination thereof; where a combination of the first RIS, the second RIS, the third RIS, and the fourth RIS comprises at least three physically separate RISes. For example, the server 400 may obtain timing information for signal transfer between the UE 830 and another device, e.g., the TRP 810 or another TRP 300, with the signal transfer being through different RISes for uplink and downlink, with at least one of these RISes being different from the RISes used to transfer the first and second PRS. For example, the device 611 may exchange the signals 632, 642 with the device 612 via the RISes 621, 622, and also exchange the signals 632, 645 with the device 612 via the RISes 621, 625, and/or exchange the signals 634, 644 with the device 614 via the RISes 622, 624, and/or exchange the signals 633, 643 with the device 613 via the RISes 623, 624. The position information unit 460 may use the timing information to determine one or more ranges to one or more corresponding RISes (e.g., not already determined) and use the ranges) to determine the location of the UE 830 (e.g., using trilateration and/or range plus angle to/from a known location). The processor 410, possibly in combination with the memory 411, possibly in combination with the transceiver 415 (e.g., the antenna 446 and the wireless receiver 444 or the wired receiver 454) may comprise means for obtaining the at least one third time value and the at least one fourth time value. The processor 410, possibly in combination with the memory 411, may comprise means for determining the third range, or the fourth range, or a combination thereof, and means for determining the location of the first wireless signaling device. In another example implementation, the third wireless signaling device is physically separate from the second wireless signaling device. For example, the UE 830 may transfer signals via RISes with two different TRPs, e.g., the device 611 may exchange PRS signals with the device 612 and the device 614.

Also or alternatively, implementations of the method 1300 may include one or more of the following features. In an example implementation, the first range, or the second range, or the combination thereof, is determined based on a cumulative travel time of the first PRS from the first wireless signaling device to the first. RIS and the second PRS from the second RIS to the first wireless signaling device. For example, the position information unit 460 may use the timing information in Equation (5), and determine a range between the UE 830 and the RIS 820 using Equation (1) and/or a range between the UE 830 and the RIS 840 using Equation (3). In another example implementation, the computing device is a server, and the method 1300 comprises: scheduling, by the server, the first PRS based on a first request for the first PRS to be reflected by the first RIS; or scheduling, by the server, the second PRS based on a second request for the second PRS to be reflected by the second RIS; or a combination thereof. For example, the server 400 may schedule DL-PRS and/or UL-PRS based on one or more RIS requests received in the report 1150 and/or the report 1160. The processor 410, possibly in combination with the memory 411, may comprise means for scheduling the first PRS or means for scheduling the second PRS, or a combination thereof.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C). or combinations with more than one feature (e AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media, Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified. value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A first wireless signaling device comprising:
   a transceiver configured to transmit and receive wireless signals;
   a memory; and
   a processor communicatively coupled to the transceiver and the memory and configured to:
      transmit, via the transceiver at a first time, a first PRS (positioning reference signal) to a second wireless signaling device via a first RIS (reconfigurable intelligent surface);
      receive, via the transceiver at a second time, a second PRS from the second wireless signaling device via a second RIS that is physically separate from the first RIS; and
      provide a signal report including at least one time value corresponding to the first time and the second time, and indicative of the first PRS and the second PRS.

2. The first wireless signaling device of claim 1, wherein the processor is further configured to transmit, via the transceiver to a server, a request for the second wireless signaling device to transmit the second PRS to the second RIS in order to transmit the second PRS to the first wireless signaling device.

3. The first wireless signaling device of claim 2, wherein the processor is configured to:
   receive a first reference signal from the second wireless signaling device via the transceiver via the second RIS;
   receive a second reference signal from the second wireless signaling device via the transceiver via a third RIS that is separate from the second RIS; and
   transmit the request for the second wireless signaling device to transmit the second PRS to the second RIS based on a first quality metric of the first reference signal at the first wireless signaling device being better than a second quality metric of the second reference signal at the first wireless signaling device.

4. The first wireless signaling device of claim 1, wherein the processor is configured to transmit the first PRS in response to receiving the second PRS.

5. The first wireless signaling device of claim 1, wherein the at least one time value comprises a time difference between the first time and the second time.

6. A signal reporting method comprising:
   transmitting, from a first wireless signaling device at a first time, a first PRS (positioning reference signal) to a second wireless signaling device via a first RIS (reconfigurable intelligent surface);
   receiving, at the first wireless signaling device at a second time, a second PRS from the second wireless signaling device via a second RIS that is physically separate from the first RIS; and
   providing a signal report including at least one time value corresponding to the first time and the second time, and indicative of the first PRS and the second PRS.

7. The method of claim 6, further comprising transmitting, to a server, a request for the second wireless signaling device to transmit the second PRS to the second RIS in order to transmit the second PRS to the first wireless signaling device.

8. The method of claim 7, further comprising:
   receiving, at the first wireless signaling device, a first reference signal from the second wireless signaling device via the second RIS; and
   receiving, at the first wireless signaling device, a second reference signal from the second wireless signaling device via a third RIS that is separate from the second RIS;
   wherein the request for the second wireless signaling device to transmit the second PRS to the second RIS is transmitted based on a first quality metric of the first reference signal at the first wireless signaling device being better than a second quality metric of the second reference signal at the first wireless signaling device.

9. The method of claim 6, wherein the first PRS is transmitted in response to receiving the second PRS.

10. The method of claim 6, wherein the at least one time value comprises a time difference between the first time and the second time.

11. A first wireless signaling device comprising:
    means for transmitting, at a first time, a first PRS (positioning reference signal) to a second wireless signaling device via a first RIS (reconfigurable intelligent surface);
    means for receiving, at a second time, a second PRS from the second wireless signaling device via a second RIS that is physically separate from the first RIS; and
    means for providing a signal report including at least one time value corresponding to the first time and the second time, and indicative of the first PRS and the second PRS.

12. The first wireless signaling device of claim 11, further comprising means for transmitting, to a server, a request for the second wireless signaling device to transmit the second PRS to the second RIS in order to transmit the second PRS to the first wireless signaling device.

13. The first wireless signaling device of claim 12, further comprising:
    means for receiving a first reference signal from the second wireless signaling device via the second RIS; and
    means for receiving a second reference signal from the second wireless signaling device via a third RIS that is separate from the second RIS;
    wherein the means for transmitting the request comprises means for transmitting the request based on a first quality metric of the first reference signal at the first wireless signaling device being better than a second quality metric of the second reference signal at the first wireless signaling device.

14. The first wireless signaling device of claim 11, wherein the means for transmitting the first PRS comprise means for transmitting the first PRS in response to receiving the second PRS.

15. The first wireless signaling device of claim 11, wherein the at least one time value comprises a time difference between the first time and the second time.

16. A computing device comprising:
    a memory; and
    a processor communicatively coupled to the memory and configured to:
        obtain at least one first time value corresponding to (1) a first time of departure of a first PRS (positioning reference signal) from a first wireless signaling device sent to a second wireless signaling device via a first RIS (reconfigurable intelligent surface) and (2) a first time of arrival of a second PRS sent from the second wireless signaling device to the first wireless signaling device via a second RIS that is physically separate from the first RIS;

obtain at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS; and determine, based on the at least one first time value and the at least one second time value, a first range between the first wireless signaling device and the first RIS, or a second range between the first wireless signaling device and the second RIS, or a combination thereof.

17. The computing device of claim 16, wherein the processor is further configured to determine a location of the first wireless signaling device based on:

the first range and a first angle of departure of the first PRS from the first wireless signaling device; or the first range and a first angle of arrival of the first PRS at the first RIS; or the second range and a second angle of departure of the second PRS from the second RIS; or the second range and a second angle of arrival of the second PRS at the first wireless signaling device; or any combination thereof.

18. The computing device of claim 16, wherein the processor is further configured to:

obtain at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RIS that is physically separate from the third RIS;

obtain at least one fourth time value corresponding to (1) a fourth time of departure of the fourth PRS from the third wireless signaling device sent to the first wireless signaling device via the fourth RIS and (2) a fourth time of arrival of the third PRS sent from the first wireless signaling device to the third wireless signaling device via the third RIS;

determine, based on the at least one third time value and the at least one fourth time value, a third range between the first wireless signaling device and the third RIS, or a fourth range between the first wireless signaling device and the fourth RIS, or a combination thereof; and determine a location of the first wireless signaling device based on (1) the first range, or the second range, or a combination thereof and (2) the third range, or the fourth range, or a combination thereof;

wherein a combination of the first RIS, the second RIS, the third RIS, and the fourth RIS comprises at least three physically separate RISes.

19. The computing device of claim 16, wherein the processor is configured to determine the first range, or the second range, or the combination thereof, based on a cumulative travel time of the first PRS from the first wireless signaling device to the first RIS and the second PRS from the second RIS to the first wireless signaling device.

20. The computing device of claim 16, wherein the computing device is a server, and wherein the processor is further configured to:

schedule the first PRS based on a first request for the first PRS to be reflected by the first RIS; or schedule the second PRS based on a second request for the second PRS to be reflected by the second RIS; or a combination thereof.

21. A position information determining method comprising:

obtaining, at a computing device, at least one first time value corresponding to (1) a first time of departure of a first PRS (positioning reference signal) from a first wireless signaling device sent to a second wireless signaling device via a first RIS (reconfigurable intelligent surface) and (2) a first time of arrival of a second PRS sent from the second wireless signaling device to the first wireless signaling device via a second RIS that is physically separate from the first RIS;

obtaining, at the computing device, at least one second time value corresponding to (1) a second time of departure of the second PRS from the second wireless signaling device sent to the first wireless signaling device via the second RIS and (2) a second time of arrival of the first PRS sent from the first wireless signaling device to the second wireless signaling device via the first RIS; and determining, at the computing device and based on the at least one first time value and the at least one second time value, a first range between the first wireless signaling device and the first RIS, or a second range between the first wireless signaling device and the second RIS, or a combination thereof.

22. The method of claim 21, further comprising determining a location of the first wireless signaling device based on:

the first range and a first angle of departure of the first PRS from the first wireless signaling device; or the first range and a first angle of arrival of the first PRS at the first RIS; or the second range and a second angle of departure of the second PRS from the second RIS; or the second range and a second angle of arrival of the second PRS at the first wireless signaling device; or any combination thereof.

23. The method of claim 21, further comprising:

obtaining, at the computing device, at least one third time value corresponding to (1) a third time of departure of a third PRS from the first wireless signaling device sent to a third wireless signaling device via a third RIS and (2) a third time of arrival of a fourth PRS sent from the third wireless signaling device to the first wireless signaling device via a fourth RIS that is physically separate from the third RIS;

obtaining, at the computing device, at least one fourth time value corresponding to (1) a fourth time of departure of the fourth PRS from the third wireless signaling device sent to the first wireless signaling device via the fourth RIS and (2) a fourth time of arrival of the third PRS sent from the first wireless signaling device to the third wireless signaling device via the third RIS;

determining, at the computing device and based on the at least one third time value and the at least one fourth time value, a third range between the first wireless signaling device and the third RIS, or a fourth range between the first wireless signaling device and the fourth RIS, or a combination thereof; and determining, at the computing device, a location of the first wireless signaling device based on (1) the first range, or the second range, or a combination thereof and (2) the third range, or the fourth range, or a combination thereof, wherein a combination of the first RIS, the second RIS, the third RIS, and the fourth RIS comprises at least three physically separate RISes.

24. The method of claim 21, wherein the first range, or the second range, or the combination thereof, is determined based on a cumulative travel time of the first PRS from the first wireless signaling device to the first RIS and the second PRS from the second RIS to the first wireless signaling device.

25. The method of claim 21, wherein the computing device is a server, and wherein the method further comprises:

scheduling, by the server, the first PRS based on a first request for the first PRS to be reflected by the first RIS; or scheduling, by the server, the second PRS based on a second request for the second PRS to be reflected by the second RIS; or a combination thereof.

* * * * *